United States Patent
Nanjyo et al.

(10) Patent No.: US 7,607,786 B2
(45) Date of Patent: Oct. 27, 2009

(54) LIGHT DEFLECTOR, LIGHT DEFLECTION ARRAY, OPTICAL SYSTEM, IMAGE FORMING DEVICE, AND PROJECTION TYPE IMAGE DISPLAY APPARATUS

(75) Inventors: Takeshi Nanjyo, Hyogo (JP); Seiichi Katoh, Miyagi (JP); Koichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 458 days.

(21) Appl. No.: 11/406,372

(22) Filed: Apr. 19, 2006

(65) Prior Publication Data

US 2006/0239009 A1    Oct. 26, 2006

(30) Foreign Application Priority Data

Apr. 20, 2005  (JP)  ............................ 2005-122422
Feb. 15, 2006  (JP)  ............................ 2006-037914

(51) Int. Cl.
  *G03B 21/28* (2006.01)
  *G03B 21/26* (2006.01)
  *G02B 7/182* (2006.01)

(52) U.S. Cl. ............................ 353/99; 353/37; 359/872

(58) Field of Classification Search ................ 353/99, 353/98, 37; 359/872, 198, 199, 875; 396/112.29
See application file for complete search history.

(56) References Cited

U.S. PATENT DOCUMENTS

| | | | |
|---|---|---|---|
| 6,900,915 B2 | 5/2005 | Nanjyo et al. | |
| 6,947,195 B2 | 9/2005 | Ohtaka et al. | |
| 2003/0142383 A1* | 7/2003 | Nanjyo et al. | 359/224 |
| 2004/0012667 A1 | 1/2004 | Ohtaka et al. | |
| 2004/0263936 A1 | 12/2004 | Nanjyo et al. | |
| 2004/0263945 A1 | 12/2004 | Nanjyo et al. | |
| 2005/0168786 A1* | 8/2005 | Nanjyo et al. | 359/198 |
| 2005/0169156 A1 | 8/2005 | Katoh et al. | |
| 2005/0179973 A1 | 8/2005 | Nanjyo et al. | |
| 2005/0248862 A1 | 11/2005 | Nanjo et al. | |
| 2005/0264866 A1 | 12/2005 | Ohtaka et al. | |

(Continued)

FOREIGN PATENT DOCUMENTS

JP    2004-78136    3/2004

(Continued)

OTHER PUBLICATIONS

U.S. Appl. No. 12/014,570, filed Jan. 15, 2008, Nanjyo, et al.

(Continued)

*Primary Examiner*—Diane I Lee
*Assistant Examiner*—Magda Cruz
(74) *Attorney, Agent, or Firm*—Oblon, Spivak, McClelland, Maier & Neustadt, L.L.P.

(57) ABSTRACT

A light deflector includes a substrate; a plurality of control members provided at edge parts of the substrate, the control members having upper parts where stoppers are situated; a fulcrum member provided on an upper surface of the substrate, the fulcrum member having a top part; a plate-shaped member movably provided in a space formed by the substrate, the fulcrum member and the stopper, the plate-shaped member having a light reflection area, no fixed end, and a conductive layer; and a plurality of electrodes provided on the substrate, the electrodes facing the conductive layer of the plate-shaped member.

15 Claims, 23 Drawing Sheets

U.S. PATENT DOCUMENTS

2006/0109539 A1* 5/2006 Katoh et al. ............. 359/291
2006/0239009 A1 10/2006 Nanjyo et al.

FOREIGN PATENT DOCUMENTS

| JP | 2004-138881 | 5/2004 |
|---|---|---|
| JP | 2004-286970 | 10/2004 |
| JP | 2004-317744 | 11/2004 |
| JP | 2005-17799 | 1/2005 |
| JP | 2005-195721 | 7/2005 |
| JP | 2005-195798 | 7/2005 |
| JP | 2005-202257 | 7/2005 |
| JP | 2005-292684 | 10/2005 |
| JP | 2005-326782 | 11/2005 |

OTHER PUBLICATIONS

U.S. Appl. No. 11/255,112, filed Oct. 21, 2005, Seiichi Katoh, et al.
U.S. Appl. No. 11/265,206, filed Nov. 3, 2005, Seiichi Katoh, et al.
U.S. Appl. No. 11/252,815, filed Oct. 19, 2005, Takeshi Nanjo, et al.
U.S. Appl. No. 11/681,021, filed Mar. 1, 2007, Katoh, et al.
U.S. Appl. No. 11/411,849, filed Apr. 27, 2006, Nanjyo, et al.
U.S. Appl. No. 11/406,372, filed Apr. 19, 2006, Nanjyo, et al.
U.S. Appl. No. 11/776,305, filed Jul. 11, 2007, Nanjyo, et al.

* cited by examiner

FIG.2

| | ELECTRODE 105a | ELECTRODE 105b | ELECTRODE 105c | ELECTRODE 105d | FULCRUM POINT 103 |
|---|---|---|---|---|---|
| INCLINATION IN DIRECTION 1 | × | × | o | o | o |
| INCLINATION IN DIRECTION 2 | × | × | o | o | × |
| INCLINATION IN DIRECTION 3 | × | o | × | o | × |
| INCLINATION IN DIRECTION 4 | × | o | × | o | o |

UNIT : V

FIG.17
(a)
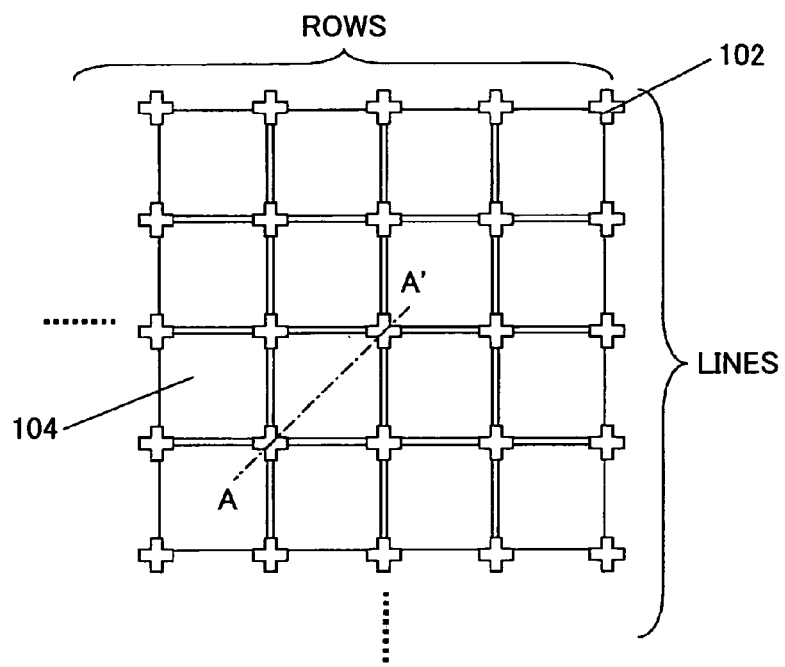
(b)
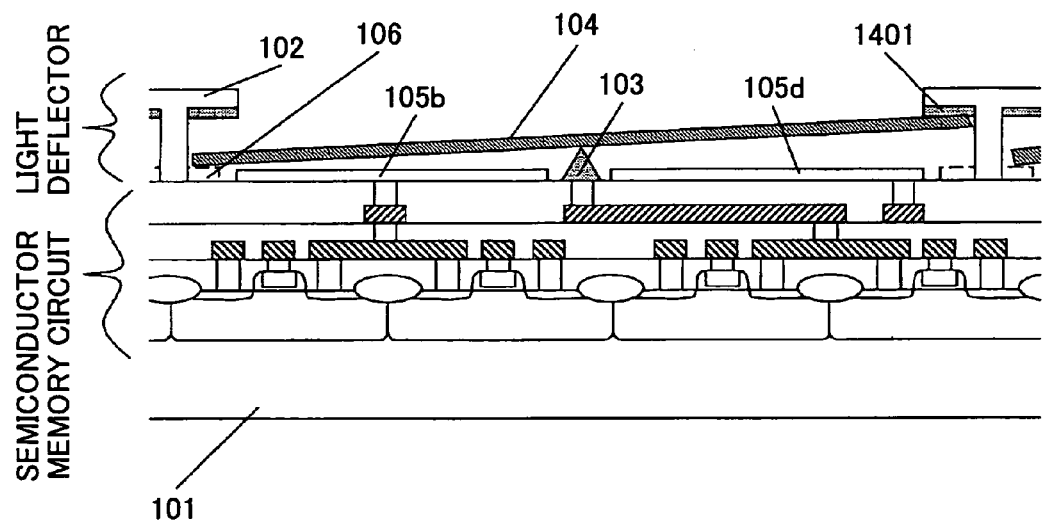

LIGHT DEFLECTOR, LIGHT DEFLECTION ARRAY, OPTICAL SYSTEM, IMAGE FORMING DEVICE, AND PROJECTION TYPE IMAGE DISPLAY APPARATUS

BACKGROUND OF THE INVENTION

1. Field of the Invention

The present invention generally relates to light deflectors, light deflection arrays, optical systems, image forming devices, and projection type image display apparatuses, whereby the direction of outgoing light compared to incident light is changed. For example, the present invention can be used for image forming devices such as electro-photographic type printers or copiers, or projection type image display apparatuses such as projectors or digital theater systems.

2. Description of the Related Art

A light deflection method, light deflector, manufacturing method of the light deflector, and a product where the light deflector is applied, previously invented by inventors of the present invention, are disclosed in Japanese Laid-Open Patent Application Publication No. 2004-78136.

More specifically, a light deflector whereby light deflection in a single axial direction or two axial directions is made is disclosed in the Japanese Laid-Open Patent Application Publication No. 2004-78136. In this light deflector, a plate-shaped member having a fixed part, namely a mirror, is closed in a space and tilt displacement with respect to a fulcrum member as a center is done by electrostatic attraction so that the light deflection is performed.

In addition, optical deflectors and optical deflection method (driving methods) in cases where a contact electric potential is applied to the plate-shaped member, namely the mirror, and the plate-shaped member is electrically floated (held aloft by electrostatic force), are also disclosed in the Japanese Laid-Open Patent Application Publication No. 2004-78136.

The main structure of such an optical deflector and a driving method are discussed below.

FIG. 1 shows a light deflector disclosed in the Japanese Laid-Open Patent Application Publication No. 2004-78136. In this light deflector the contact electric potential is applied to the plate-shaped member, namely the mirror. This light deflector has a structure where the light deflection is made in both directions of each of two axes for a total of four directions.

FIG. 1(a) is a plan view of the light deflector, FIG. 1(b) is a cross-sectional view taken at a line A-A' of FIG. 1(a), FIG. 1(c) is a cross-sectional view taken at a line B-B' of FIG. 1(a), and FIG. 1(d) is a cross-sectional view taken at a line C-C' of FIG. 1(a). FIG. 1 illustrates a single light deflector of a light deflection array where plural light deflectors are two-dimensionally arranged.

Referring to FIG. 1, the light deflector has a substrate 101, plural control members 102, a fulcrum member 103, a plate-shaped member 104, plural electrodes 105a, 105b, 105c and 105d, and an insulation layer 106 (fulcrum member 103 and electrodes 105a to 105d are illustrated with transparency). The plural control members 102 have stoppers in upper parts thereof. The stoppers 102 are provided at corresponding ends of substrate 101. The fulcrum member 103 has a top end made of a conductive member and is provided in the upper side of substrate 101.

The plate-shaped member 104 does not have a fixed edge. In addition, the plate-shaped member 104 has a light reflection area and a conductive material layer having electro-conductivity in at least one part. The plate-shaped member 104 is deployed to move in the space between insulation layer 106 and fulcrum member 103, but has its movement stopped by the stoppers 102. Electric potential of the plate-shaped member 104 is given by contact with the fulcrum member 103.

The plural electrodes 105a, 105b, 105c and 105d are formed in corresponding areas on top of the substrate 101. In addition, the plural electrodes 105 face a conductive material layer of the plate-shaped member 104. Applying different electrical potentials to the electrodes 105 controls an inclination or slant angle of the plate-shaped member 104.

A contact portion 106, not disclosed in the Japanese Laid-Open Patent Application Publication No. 2004-78136, is provided for reducing the contact area when the plate-shaped member 104 comes in contact with the substrate 101 due to tilt displacement.

The light deflector is tilted and displaced in directions 1 through 4 as shown in FIG. 1(c) and FIG. 1(d) by a combination of electric potentials applied to the fulcrum member 103 and the electrodes 105a through 105d. Corresponding to this, for example, light incident from a direction perpendicular to the substrate 101 surface can be reflected in the directions 1 through 4. In addition, light incident from the directions 1 through 4 can be reflected in a direction perpendicular to the substrate 101.

FIG. 2 shows a relationship between combination of electric potential application and a tilt direction of the plate-shaped member 104. As shown in FIG. 2, the light deflection in four direction can be made by combining and applying two kinds of electric potentials, namely X(V) and O(V), to five electrodes.

The above-described light deflector has the following advantages:

(a) Control of an inclination corner of a mirror (plate-shaped member 104) is easy and stable with a dip angle which dip angle is determined by contact of a fulcrum member and a substrate by the plate-shaped member;

(b) Response speed, for inclining the plate-shaped member, of a film to turn fast at high speed by applying different electrical current potentials to the electrodes can be achieved;

(c) The plate-shaped member does not have a fixed edge, and thereby there is little long-term deterioration, and the plate-shaped member can be driven by a low voltage;

(d) There are few shocks by collision with a stopper as the stopper is small, and a lightweight plate-shaped member can be formed by a semiconductor process, so that there is little long-term deterioration;

(e) The on/off ratio of reflection light (the S/N ratio in picture machinery, the contrast ratio in picture machinery) can be improved by the constitution of a control member and a plate-shaped member and its light reflection area;

(f) Miniaturization and an integration are possible at low cost by employing a semiconductor process; and (g) A light deflection of 2 dimensions of 1 axis and a light deflection of 3 dimensions of 2 axes are possible by disposing plural electrodes.

Thus, the above-discussed light deflector has a lot of advantages and is better than a conventional twisting type optical switch or a diffraction grating type optical switch.

In addition, an optical system using the light deflector as a projection type image display apparatus is disclosed in Japanese Laid-Open Patent Application Publication No. 2004-138881. In Japanese Laid-Open Patent Application Publication No. 2004-13888, an optical system using an optical deflection array making the light deflection in two axial/four directions is disclosed. More specifically, two optical systems are suggested.

In a first optical system, white light shaped as parallel light is incident from a right upper side on the light deflection array having two axial/four light deflection directions. The white light is deflected in a specific deflection direction by red color information of three primary colors. The light being deflected reaches an image display part via a color filter in a light path, a first field lens, a projection lens and a second field lens so that color information wherein a single light deflector is regarded as a single pixel is formed on the image display part. Other colors are also deflected in specific directions so as to be overlapped on the image display part in a time order and recognized as a color image. Since three color displaying, wherein a single light deflection array (display device) is used without a color wheel, can be made by using such an optical system, it is possible to provide a projection type image display apparatus having a simple structure at low cost.

In a second optical system, three light sources individually emitting light fluxes corresponding to three primary colors of image information are used. The light fluxes from three light sources are incident on a single light deflection array from different directions and are deflected by the light deflectors forming the light deflection arrays in a time order. Reflection directions of the light fluxes of the colors are perpendicular to a surface of the light deflection array. Each light flux is lead to a single projection lens in time order so as to be projected and displayed on the image display part. Since three color displaying, wherein a single light deflection array (display device) is used without a color wheel, can be made in the second optical system, it is possible to provide a projection type image display apparatus having a simple structure at a low cost.

In addition, Japanese Laid-Open Patent Application Publication No. 2004-286970 discloses a structure where arrangement of plural electrodes formed on the substrate is improved so that stability of a light deflection operation is improved. Japanese Laid-Open Patent Application Publication No. 2004-317744 discloses a technique wherein an electret member is formed by a plate-shaped member so that the number of electrodes is reduced, manufacturing cost for unifying with a driving system is reduced, and the size of an apparatus is made small. In addition, Japanese Laid-Open Patent Application Publication No. 2005-17799 discloses a technique wherein plural electrodes formed on the substrate of the light deflector are driven in a bipolar manner so that storage of electric charge in an insulation film is prevented and stability of light deflection operation is improved.

As discussed above, the light deflector shown in FIG. 1 accrues a lot of advantages by using the plate-shaped member 104 not having the fixed part as the mirror. However, the plate-shaped member 104 no having the fixed part comes in contact with members forming the light deflector in the light deflection operation such as the contact part 106, the control members 102 including a stopper part and the fulcrum member 103.

The plate-shaped member is tilted and displaced by an electrostatic attraction force generated between the plural electrodes formed on the substrate and the plate-shaped member so that the light deflection apparatus is deflected. The light deflection apparatus applies a force always pushing on the fulcrum member by the plate-shaped member due to the electrostatic attraction. The light deflection apparatus makes the contact part formed on the substrate incline and collide to apply a force and makes the control member including the stopper have irregular contact for applying a force.

FIG. 3 is a cross-sectional view of the light deflector taken along a line A-A' of FIG. 1. In FIG. 3, forces acting on the substrate at the time of the light deflection operation are shown by white arrows. These forces change energy or heat to strain of the members and fix the plate-shaped member to the substrate. In order to tilt and displace the plate-shaped member beyond the fixing force, it is necessary to increase voltage applied to plural electrodes and this causes obstacles to a low voltage driving the light deflector.

Thus, there is a problem in not only the light deflector giving the electric potential to the plate-shaped member via the fulcrum member but also the light deflector displacing the electrically floating plate-shaped member. In addition, in the twisting type optical switch or a both sides fixed beam type optical switch, such fixing happens when a member formed on the mirror comes in contact with an optional member formed on the substrate at the time of the optical operations.

At the waiting time when the light deflector does not work, since the electric potential is not applied to plural electrodes 105 formed on the substrate, the electrostatic attraction force does not act between the electrodes 105 and the plate-shaped member 104 so that the plate-shaped member 104 may freely move and come in contact with the stopper 102. The plate-shaped member 104 may be fixed to the stopper 102, as corresponding to collision energy with the plate-shaped member 104, surface energy difference between the stopper 102 and the plate-shaped member 104, an area contacting the stopper 102, or the environment such as temperature or humidity where the light deflector is provided.

FIG. 4 is a cross-sectional view of the light deflector taken along a line A-A' of FIG. 1. FIG. 4 schematically shows a state where the plate-shaped member 104 freely moves at the time of waiting so as to come in full contact with and be fixed to the stopper 102. In the conventional art, by giving different electric potentials to plural electrodes provided so as to face the plate-shaped member 104 at the beginning of working, electric potential is electrostatically induced in the plate-shaped member 104 fixed to the stopper 102 so that the electrostatic attraction force exceeding the fixing force is generated and the plate-shaped member 104 is attracted to the side of the substrate 101 (reset operation).

In order to make the light deflector minute and the light deflection array have high integration as corresponding to a requirement for high precision or low cost of recent optical systems, it is necessary to reduce the area of the plate-shaped member 104 inducing the mirror area. Since the area of plural electrodes 105 facing the plate-shaped member 104 is reduced corresponding to this, it is necessary to increase the electric potential (reset voltage) given to plural electrodes 105 at the time of the reset operation. Increase of the reset voltage may make low voltage driving of the light deflector difficult and increase the consumption of electric power of products using the light deflector such as the optical system, image forming device, and projection type image display apparatus.

As discussed above, the problem to be solved by the present invention is based on the force acting due to the light deflection operation of the mirror, the force causing the plate-shaped member 104 to be fixed to members formed on the substrate. The present invention prevents such fixing so that low voltage driving can be achieved.

Generally, fixing may be generated by the electrostatic force, a water cross-linking force or a force between molecules. The electrostatic force may be caused by electrostatic charge. The water cross-linking force depends on absorption of moisture on a surface or under environmental conditions at the time of light deflection operation. The force between molecules depends on a distance with a contacted part. The fixing problem for the present invention is caused by the force between the molecules. Generally, the contact part or the plate-shaped member forming the light deflector is a thin film formed by a sputtering method or a CVD method and has a surface roughness of several tens through several hundreds nm. The contact at the film having such a surface roughness may not be influenced by the fixing due to the force between the molecules because the distance is too long.

In the conventional art, in a case where material of the contact part 106 is made of an aluminum group metal such as Al-1 wt % Si-0.5 wt % Cu or Al-2 wt % Cu generally used in a semiconductor process, and the material of the plate-shaped member 104 is made of an aluminum metal such as Al-1 wt % Ti or pure Al having a high reflection rate, its melting point is approximately 660° C. and lower, its Young's modulus is 70 through 100 GPa and lower, and its hardness by a non-indentation method is 2 through 3 GPa and lower. Because of this, the energy is converted to heats or strain of a member of the contact part by the collision force at the contact part 106 by the light deflection operation and the pushing force at the fulcrum member 103. As a result of this, the forming member is deformed, the contact distance is short, the contact area is increased, and the fixing force is increased. The light deflection at the driving voltage of several volts is difficult and therefore application of the driving voltage equal to or greater than 10 V is necessary for beginning the light deflection operation by overcoming fixing.

SUMMARY OF THE INVENTION

Accordingly, it is a general object of the present invention to provide a novel and useful light deflector, light deflection array, optical system, image forming device, and projection type image display apparatus.

The above object of the present invention is to provide a light deflector, light deflection array, optical system, image forming device, and projection type image display apparatus, wherein an optional part (contact part or fulcrum part) on the substrate or a corresponding contact part of a plate-shaped member where the plate-shaped member (mirror) comes in contact when being tilted and displaced is made of a heat resistant (high melting point) film and with little mechanical deformation (namely hardness) so that the fixing by the acting force is prevented and the low voltage driving of the light deflector is implemented.

The above object of the present invention is also to provide a light deflector, light deflection array, optical system, image forming device, and projection type image display apparatus, wherein an optional part of a stopper facing the plate-shaped member is made of a rigid (hard) layer so that the fixing of the plate-shaped member to the stopper is prevented and the low voltage driving of the light deflector is implemented.

It is also an object of the present invention to provide a light deflector, including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is also an object of the present invention to provide a light deflection array wherein a plurality of light deflectors is arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is also an object of the present invention to provide an optical system, including:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is also an object of the present invention to provide a projection type image display apparatus using an optical system as a projection optical system,
the optical system including:
a light deflection array;
a light source configured to light the light deflection array; and
a projection lens configured to project a reflection light from the light deflection array as corresponding to color information;
wherein the light deflection array has a plurality of light deflectors which light deflectors are arranged in one dimension or two dimensions,
the light deflector including:
a substrate;
a plurality of control members provided at edge parts of the substrate, the control members having upper parts where stoppers are situated;
a fulcrum member provided on an upper surface of the substrate, the fulcrum member having a top part;
a plate-shaped member movably provided in a space formed by the substrate, the fulcrum member, and the stopper, the plate-shaped member having a light reflection area, no fixed end, and a conductive layer; and
a plurality of electrodes provided on the substrate, the electrodes facing the conductive layer of the plate-shaped member;
wherein the plate-shaped member is tilted and displaced by an electrostatic attraction force in a state where the fulcrum member is a center, so that a reflection direction of a light flux incident on the light reflection area is changed and thereby light deflection is performed; and
an optional part, formed at the substrate, with which optional part the plate-shaped member comes in contact, is made of a layer whose main ingredient is a high melting point metal element.

It is also an object of the present invention to provide a projection type image display apparatus using an optical system as a optical writing unit, the optical system including:
a light deflection array;
a light source configured to light the light deflection array; and
a projection lens configured to project a reflection light from the light deflection array as corresponding to color information;
wherein the light deflection array has a plurality of light deflectors which light deflectors are arranged in one dimension or two dimensions,
the light deflector including:
a substrate;
a plurality of control members provided at edge parts of the substrate, the control members having upper parts where stoppers are situated;
a fulcrum member provided on an upper surface of the substrate, the fulcrum member having a top part;
a plate-shaped member movably provided in a space formed by the substrate, the fulcrum member, and the stopper, the plate-shaped member having a light reflection area, no fixed end, and a conductive layer; and
a plurality of electrodes provided on the substrate, the electrodes facing the conductive layer of the plate-shaped member;
wherein the plate-shaped member is tilted and displaced by an electrostatic attraction force in a state where the fulcrum member is a center, so that a reflection direction of a light flux incident on the light reflection area is changed and thereby light deflection is performed; and
an optional part, formed at the substrate, with which optional part the plate-shaped member comes in contact, is made of a layer whose main ingredient is a high melting point metal element.

It is also an object of the present invention to provide a light deflector, including:
a substrate;
a plurality of control members provided at edge parts of the substrate, the control members having upper parts where stoppers are situated;
a fulcrum member provided on an upper surface of the substrate, the fulcrum member having a top part;
a plate-shaped member movably provided in a space formed by the substrate, the fulcrum member, and the stopper, the plate-shaped member having a light reflection area, no fixed end, and a conductive layer; and
a plurality of electrodes provided on the substrate, the electrodes facing the conductive layer of the plate-shaped member;
wherein the plate-shaped member is tilted and displaced by an electrostatic attraction force where the fulcrum member is a center, so that a reflection direction of a light flux incident on the light reflection area is changed and thereby light deflection is performed; and
an optional part, formed at the plate-shaped member, with which optional part the substrate comes in contact, is made of a layer whose main ingredient is a high melting point metal element.

It is also an object of the present invention to provide a light deflection array wherein a plurality of light deflectors is arranged in one dimension or two dimensions, the light deflector including:
a substrate;
a plurality of control members provided at edge parts of the substrate, the control members having upper parts where stoppers are situated;
a fulcrum member provided on an upper surface of the substrate, the fulcrum member having a top part;
a plate-shaped member movably provided in a space formed by the substrate, the fulcrum member, and the stopper, the plate-shaped member having a light reflection area, no fixed end, and a conductive layer; and
a plurality of electrodes provided on the substrate, the electrodes facing the conductive layer of the plate-shaped member;
wherein the plate-shaped member is tilted and displaced by an electrostatic attraction force in a state where the fulcrum member is a center, so that a reflection direction of a light flux incident on the light reflection area is changed and thereby light deflection is performed; and
an optional part, formed at the plate-shaped member, with which optional part the substrate comes in contact, is made of a layer whose main ingredient is a high melting point metal element.

It is also an object of the present invention to provide an optical system, including:
a light deflection array;
a light source configured to light the light deflection array; and
a projection lens configured to project a reflection light from the light deflection array as corresponding to color information;
wherein the light deflection array has a plurality of light deflectors which light deflectors are arranged in one dimension or two dimensions,
the light deflector including:
a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force where the fulcrum member is a center, so that a reflection direction of a light flux incident on the light reflection area is changed and thereby light deflection is performed; and an optional part, formed at the plate-shaped member with which optional part the substrate comes in contact, is made of a layer whose main ingredient is a high melting point metal element.

It is also an object of the present invention to provide a

A projection type image display apparatus using an optical system as a projection optical system, the optical system including:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the plate-shaped member, with which optional part the substrate comes in contact, is made of a layer whose main ingredient is a high melting point metal element.

It is also an object of the present invention to provide a projection type image display apparatus using an optical system as a optical writing unit, the optical system including:

a light deflection array;

a light source configured to light the light deflection array; and a projection lens configured to project a reflection light from the light deflection array as corresponding to color information, wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the plate-shaped member, with which optional part the substrate comes in contact, is made of a layer whose main ingredient is a high melting point metal element.

It is also an object of the present invention to provide a light deflector, including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part of the stopper facing the plate-shaped member is made of a rigid layer.

It is also an object of the present invention to provide a light deflection array wherein a plurality of light deflectors is arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part of the stopper facing the plate-shaped member is made of a rigid layer.

It is also an object of the present invention to provide a n optical system, including:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force where the fulcrum member is a center, so that a reflection direction of a light flux incident on the light reflection area is changed and thereby light deflection is performed; and an optional part of the stopper facing the plate-shaped member is made of a rigid layer.

According to the above-mentioned aspect of the invention, it is possible to provide a light deflector, light deflection array, optical system, image forming device, and projection type image display apparatus, wherein an optional part (contact part or fulcrum part) on the substrate or a corresponding contact part of a plate-shaped member where the plate-shaped member (mirror) comes in contact when being tilted and displaced is made of a heat resistant (high melting point) film and with little mechanical deformation (namely hardness) so that the fixing by the acting force is prevented and the low voltage driving of the light deflector is implemented.

It is also possible to provide a light deflector, light deflection array, optical system, image forming device, and projection type image display apparatus, wherein an optional part of a stopper facing the plate-shaped member is made of a rigid (hard) layer so that the fixing of the plate-shaped member to the stopper is prevented and the low voltage driving of the light deflector is implemented.

Other objects, features, and advantages of the present invention will become more apparent from the following detailed description when read in conjunction with the accompanying drawings.

BRIEF DESCRIPTION OF THE DRAWINGS

FIG. 2 shows a related art driving way.

FIG. 17 shows an optical system of a twelfth embodiment of the present invention;

DETAILED DESCRIPTION OF THE PREFERRED EMBODIMENTS

A description of the present invention is now given, with reference to FIG. 4 through FIG. 23, including embodiments of the present invention.

Figure 1:
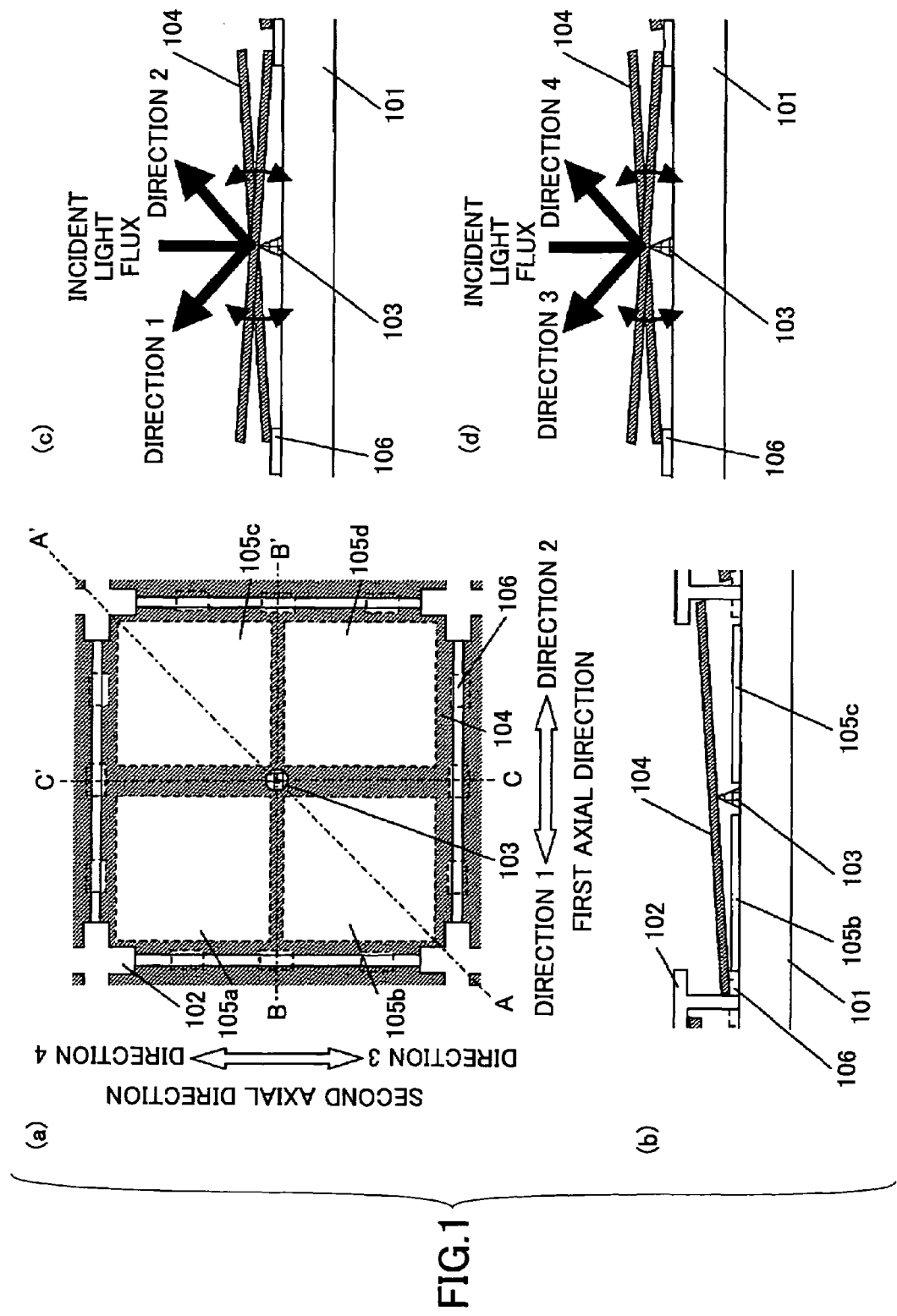
FIG. 1 shows a related art light deflector.
Figure 3:
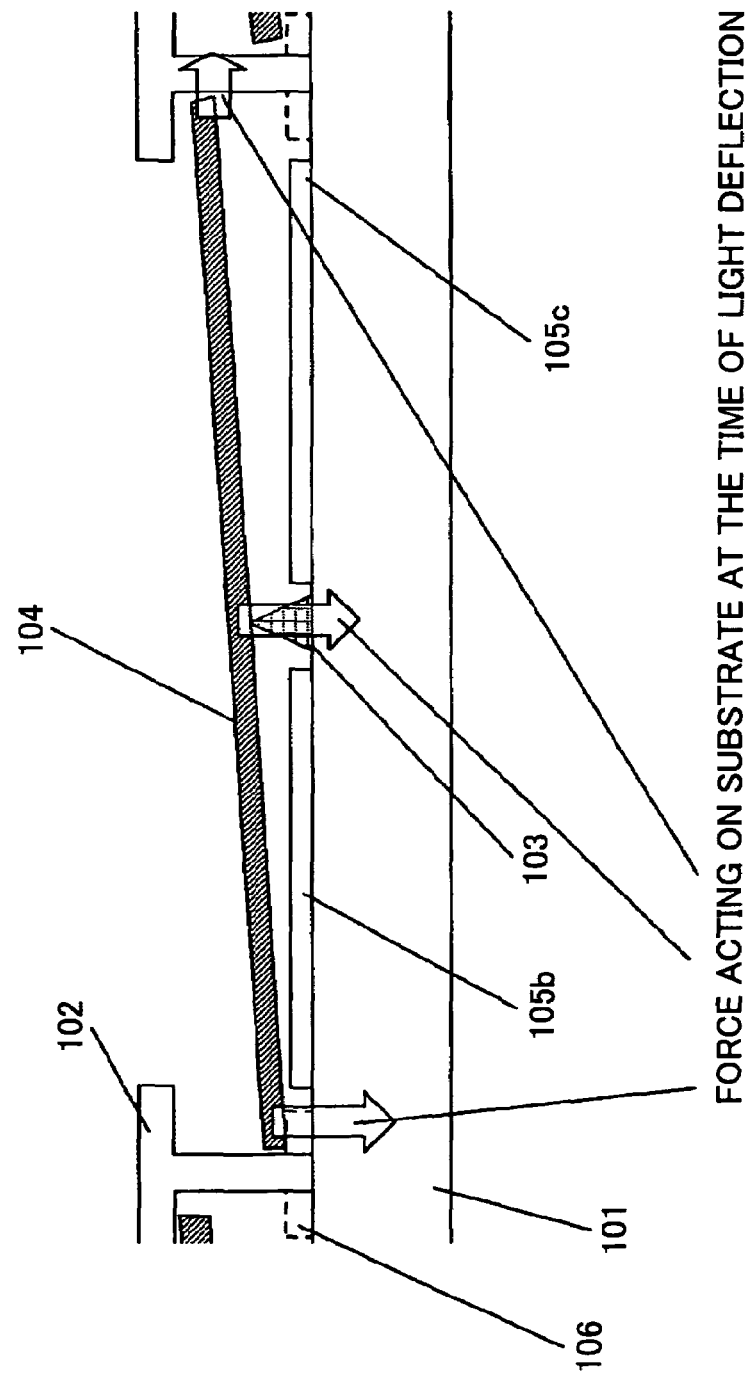
FIG. 3 shows a problem of the related art.
Figure 4:
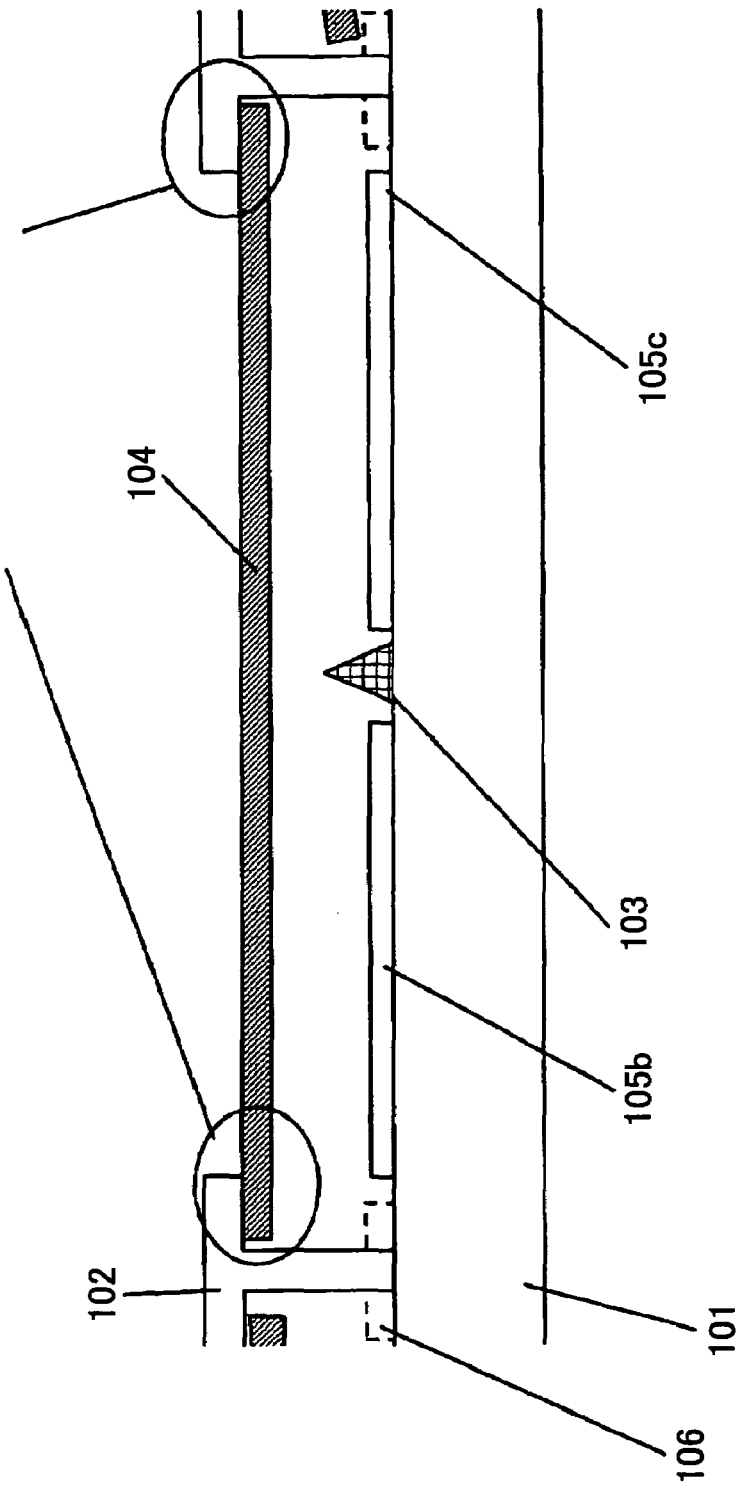
FIG. 4 shows problem of the related art.

In the following explanation, since members forming a light deflector, a manufacturing method, and a driving method of the light deflector of the present invention are the same as those of the related art shown in FIG. 1, their explanation is omitted. In addition, the plate-shaped member forming the light deflector may electrically float (be held aloft by electrostatic force) or receive an electric potential via a fulcrum member.

Furthermore, the light deflector of the present invention includes both a light deflector performing a single axial, two dimensional light deflection operation and a light deflector performing a two axial, three dimensional light deflection operation.

In addition, the present invention includes a case where a member with a mirror formed thereon comes in contact with an optional member formed on a substrate at an optical switch operation in a twisting beam type optical switch or a both ends fixing beam type optical switch.

FIRST EXAMPLE

Figure 5:
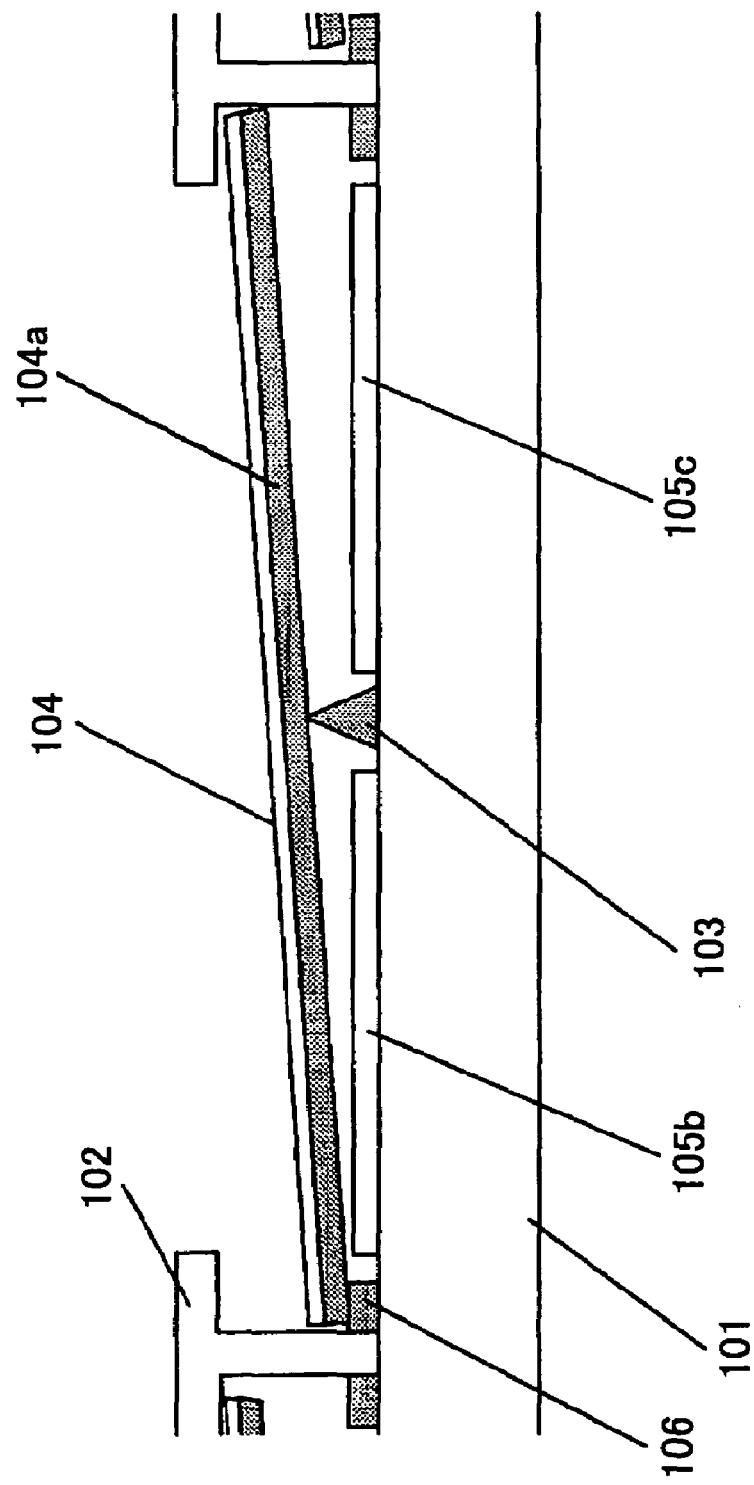
FIG. 5 shows a light deflector of a first embodiment of the present invention.

FIG. 5 is an A-A' cross-sectional view (see FIG. 1(a)) of a light deflector of a first example of the present invention. In the first example, a lower layer 104a of the plate-shaped member 104, in addition to the fulcrum member 103 and the contact part 106, is formed by a layer (shown in gray color) whose main ingredient is a high melting point metal element. In addition, an aluminum group metal film having a high reflection ratio is formed on an upper layer of the plate-shaped member 104.

The lower layer 104a whose main ingredient is the high melting point metal element is defined as including 50 wt % or more of the high melting point metal element. More specifically, the lower layer 104a may be a single layer film, an alloy film, a nitride firm, or oxide film of titanium, zirconium, tantalum, chrome, molybdenum, or tungsten.

In the first example, the tungsten single layer film is used. The lower layer 104a has a high heating resistance, high Young's modulus and rigidity. The lower layer 104a may not be mechanically deformed by a force acting based on the above-discussed light deflection operation. Hence, it is possible to prevent the increase of the contact area, the contacting distance and the fixing force.

The tungsten of the first example has a melting point of approximately 3400° C., a high Young's modulus (approximately 300 GPa), and rigidity determined by the non-indentation method (approximately 15 through 200 GPa). Hence, it is possible to prevent the increase of the fixing force. The tungsten film is formed by the CVD method or the sputtering method and patterned with a dry etching technique of a $SF_6$ gas group.

SECOND EXAMPLE

Figure 6:
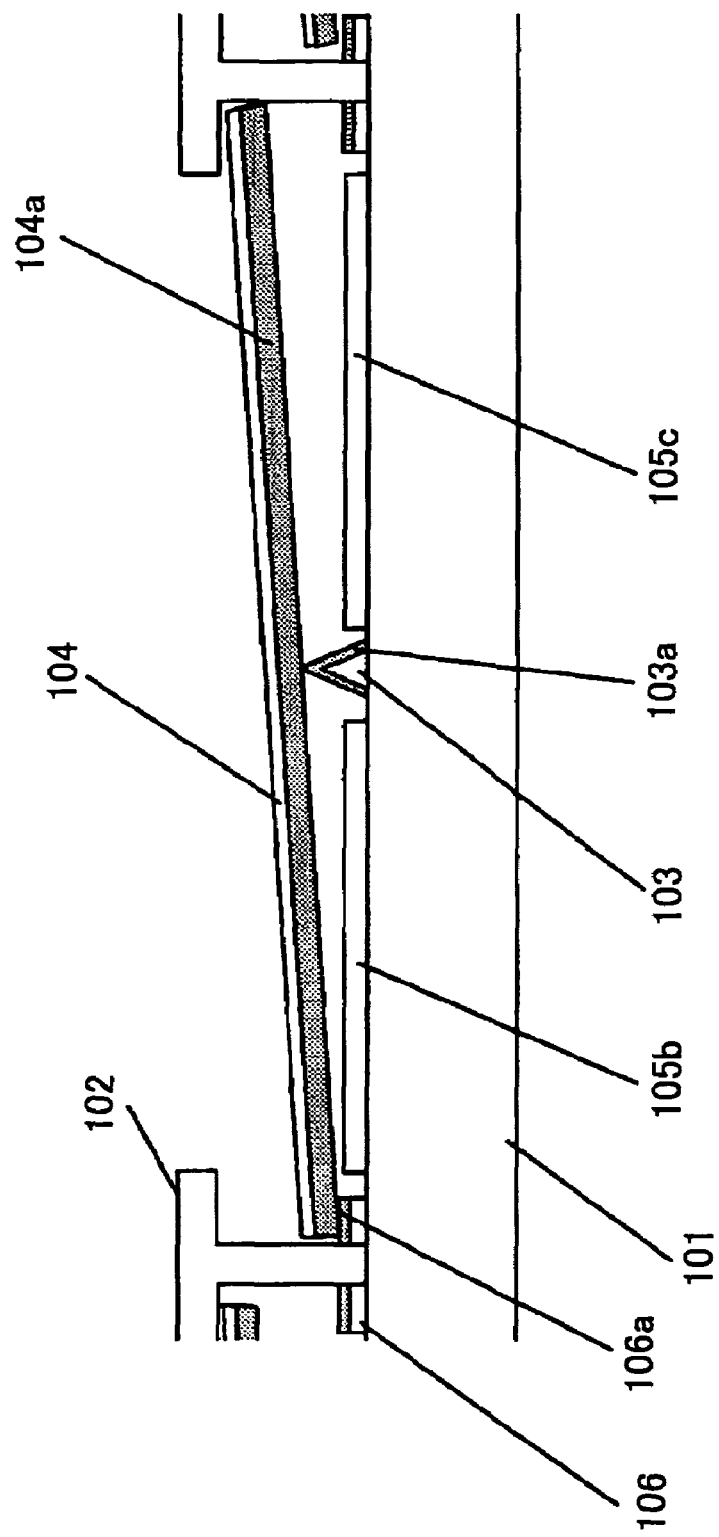
FIG. 6 shows a light deflector of a second embodiment of the present invention.

FIG. 6 is an A-A' cross-sectional view of a light deflector of a second example of the present invention. In the second example, an upper layer 103a of a fulcrum member 103, an upper layer 106a of a contact part 106, and a lower layer 104a of a plate-shaped member 104 are formed by titanium nitride film. An aluminum group metal film having a high reflection ratio is formed on an upper layer of the plate-shaped member 104. The fulcrum member 103 and the contact part 106 are formed, if necessary, by an insulation film such as a silicon oxide film or a conductive film such as the aluminum group metal film.

In the second example, while the titanium nitride film is formed on the upper layer 103a of the fulcrum member 103 and the upper layer 106a of the contact part 106, the present invention is not limited to this.

While the titanium nitride film of the second example is a nitride film, the titanium nitride film has a conductivity of approximately 2E-4 Ωcm, a melting point of approximately 3000° C., a Young's module of 250 GPa and a rigidity by the nano indentation method of approximately 15 GPa. Hence, the fixing force can be well prevented.

The titanium nitride film is deposited by a reactive sputtering method using argon gas and nitrogen gas or by a sputtering method whose target is titanium nitride material and formed by patterning with a dry etching technique using BCI3/C12 gas. Since the titanium nitride film is generally used for a semiconductor manufacturing process, the titanium nitride film matches with integration with the LSI.

THIRD EXAMPLE

Figure 7:
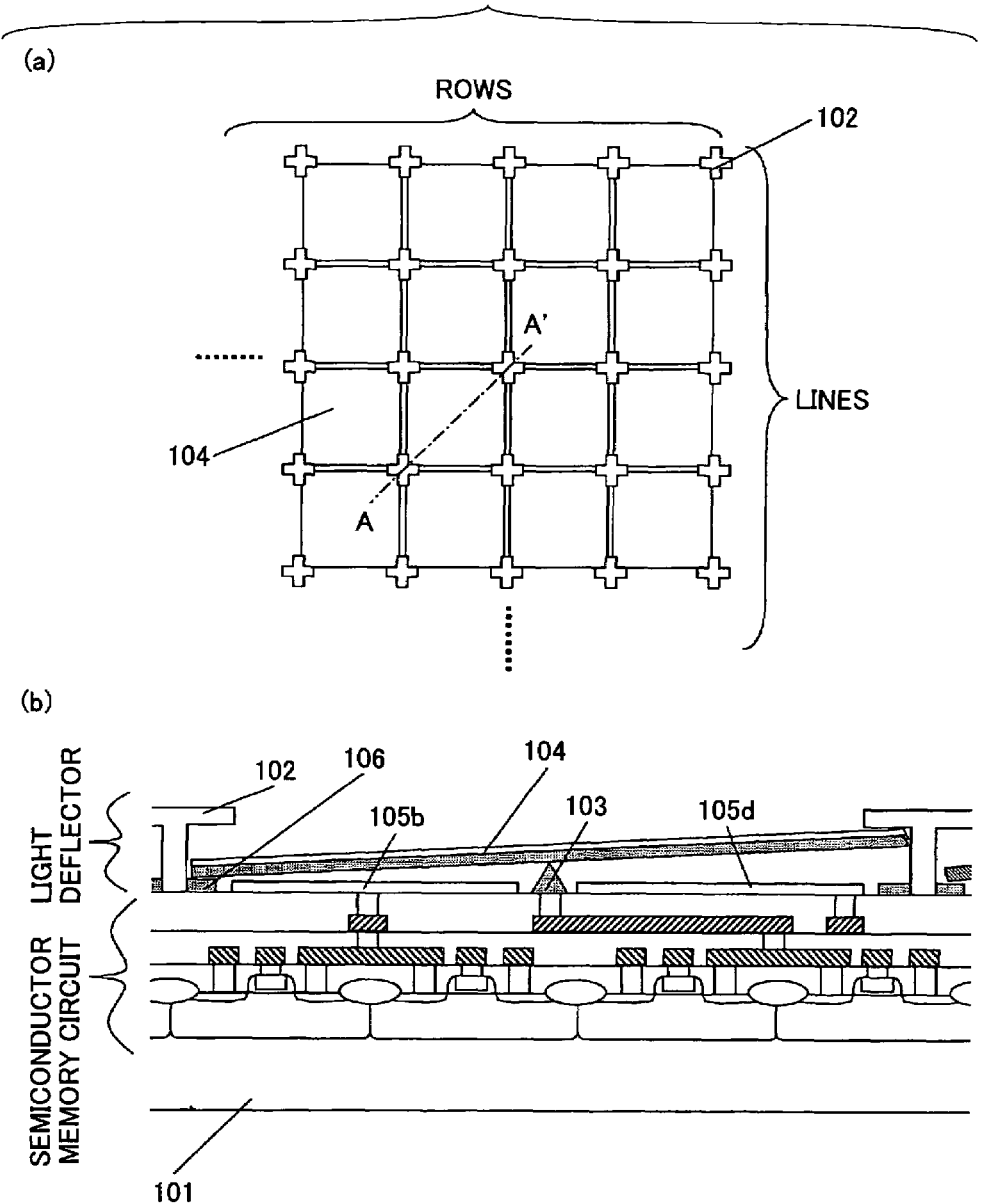
FIG. 7 shows a light deflection array of a third embodiment of the present invention.

FIG. 7 shows a light deflection array where plural light deflectors of the first example are arranged in a two dimensional array. More specifically, FIG. 7(a) is an upper surface view of the light deflection array of the third example and FIG. 7(b) is an A-A' cross-sectional view of FIG. 7(a).

In the third example, the light deflectors of the present invention are arranged in m lines×n rows. The light deflector performs the light deflection operation as corresponding to a supplied driving signal. Since the low voltage driving of the light deflector at the time of the light deflection can be made, the supplied driving signal may have the low voltage.

The driving signal is stored in a semiconductor memory circuit formed right below the light deflector so as to let all of the light deflectors perform light deflection operations. For example, as discussed in Japanese Laid-Open Patent Application Publication No. 2004-320821, data designating a tilt direction of the plate-shaped member is input and stored in the semiconductor memory circuit, and a cell output of the semiconductor memory circuit is connected to an electrode giving an electric potential of a conductive layer of the plate-shaped member of the corresponding light deflector. Furthermore, in this example, the low voltage driving signal can be used and the memory circuit which can be driven at the low voltage, such as a 3V driving SRAM, is used as the semiconductor memory circuit. Since a low voltage driving SRAM has a small occupied area of 100 $\mu m^2$, such an SRAM contributes to making a small-sized and highly integrated light deflection array, so that it is possible to increase the number of the SRAMs provided from a single silicon wafer so that the manufacturing cost can be reduced.

FOURTH EXAMPLE

Figure 8:
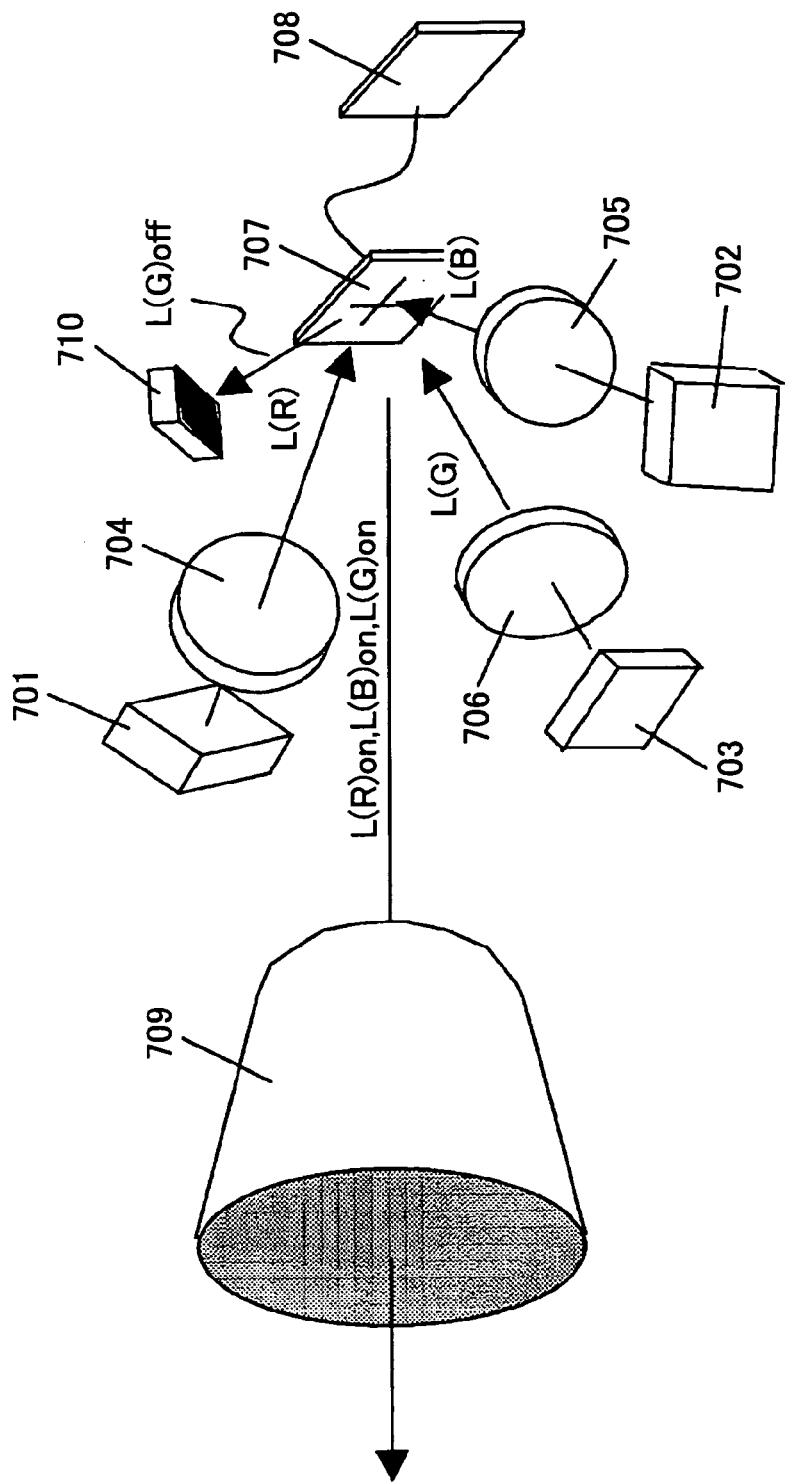
FIG. 8 shows an optical system of a fourth embodiment of the present invention.

FIG. 8 shows an optical system of a fourth example of the present invention. This optical system is based on the optical system used for the projection type image display apparatus developed by the inventor of the present invention and discussed in Japanese Laid-Open Patent Application Publication No. 2004-13888. That is, the light deflection array can make the light deflect in the two axial/four directions. The light deflection array reflects three light sources lights corresponding to RGB three primary colors in a direction perpendicular to the array surface based on image information so as to lead the lights to a projection lens for projection display. The timing for switching the light deflection direction for displaying the colors is discussed in Japanese Laid-Open Patent Application Publication No. 2004-138881.

The optical system of the fourth example of the present invention has three primary colors light sources (red 701, blue 702, and green 703) lighting the light deflection array 707 of the third example. The three primary colors lights are irradiated toward a single light deflection array 707 from the primary colors light sources (red 701, blue 702, and green 703). As the light sources of the three primary colors, array light sources such as LD light sources or LED light sources are used.

Three primary colors lights L(R), L(G) and L(B) pass through corresponding corrective lenses 704, 705 and 706 so that brightness distribution of the light sources or directivity is improved, an aperture is arranged, and the lights are corrected in rectangular shapes. The corrected three primary colors lights L(R), L(G) and L(B) come into a single light deflection array 707 from different directions. The light deflection directions of the light deflectors forming the light deflection array 707 whereby the light deflection in the two axial/four directions are applied to red information display, blue information display, green information display, and non color-display (OFF operation).

As corresponding to image information, namely color information of respective colors, three primary color lights are reflected in the direction perpendicular to the array surface so as to be led to the projection lens 709 for projection display.

At the time of black display, namely the OFF operation, the three primary color lights are not reflected in a direction perpendicular to the array surface. A part of the lights such as the L(G) light in FIG. 7, is reflected to a direction different from an object and absorbed by a light absorption plate 710. The light absorption plate 710 may be arranged as corresponding to the three primary color lights.

For displaying the color information of the pixels, it is necessary for the light deflectors forming the light deflection array to determine the direction. A control for the determination is implemented by a control chip or control board 708 connected to the light deflection array.

The optical system of the present invention is a small and simple optical system wherein a color wheel is not used and image projection can be made by a single light deflection array. Therefore, since the LD, LED or array light source is used as the light source, the amount of heat is small and the optical system is small and has small consumption electric power. The optical system does not need for fan for cooling.

FIFTH EXAMPLE

Figure 9:
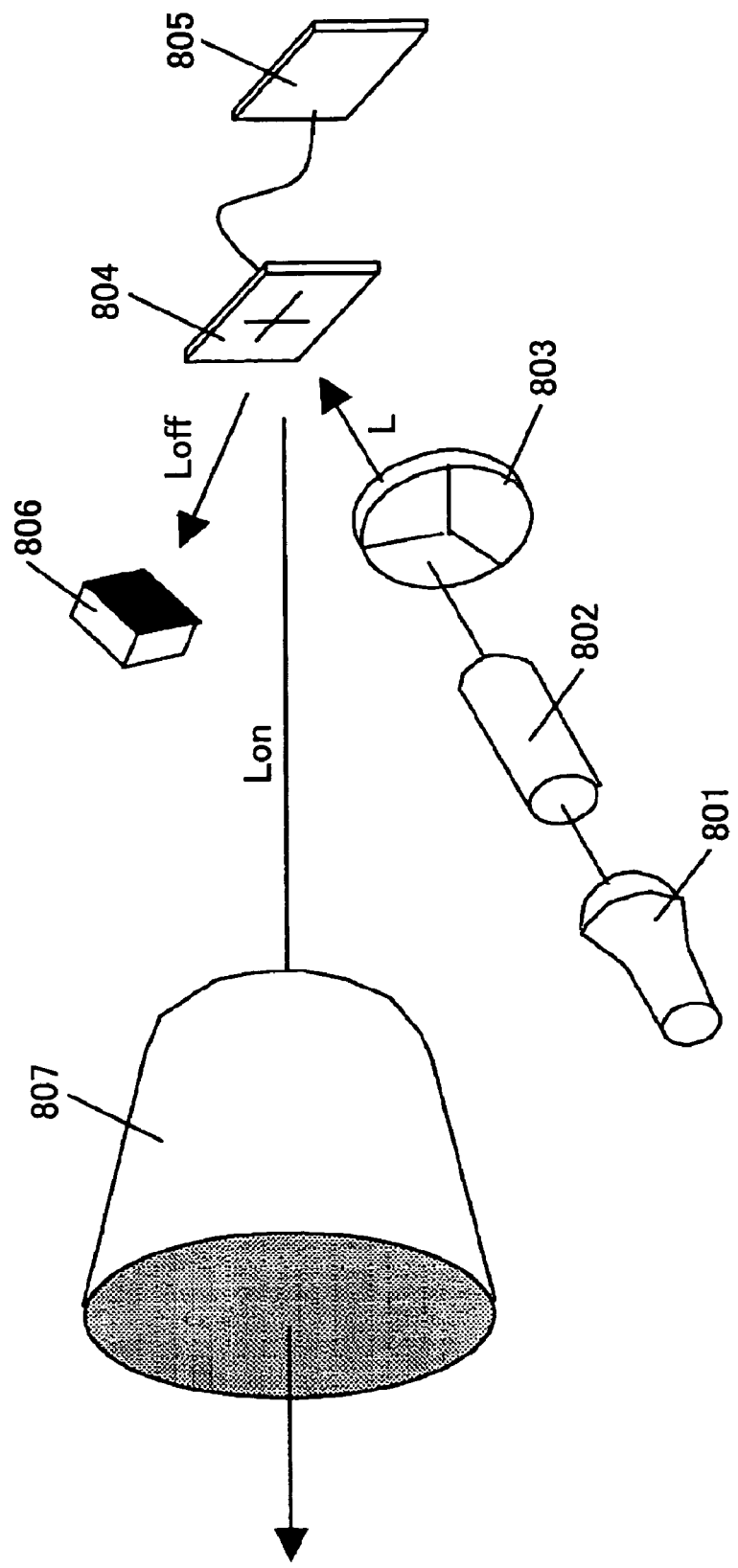
FIG. 9 shows an optical system of a fifth embodiment of the present invention.

FIG. 9 shows an optical system of a fifth example of the present invention. The optical system of the fifth example of the present invention is based on the optical system used for the projection type image display apparatus discussed in Japanese Laid-Open Patent Application Publication No. 2004-78136. This projection type image display apparatus time-divisionally displays the three primary colors by using a color wheel.

The optical system shown in FIG. 8 has a white color light source 801 such as a halogen lamp or a xenon lamp, a rod lens 802 for correcting a light source light, a color wheel 803 having at least a three primary colors color filter, the light deflection array 804, a control chip 805 configured to control the light deflection direction of the light deflectors forming the light deflection array, a light absorption plate 806, and a projection lens 807.

The light deflector forming the light deflection array 804 used for the optical system of the fifth example of the present invention is not the light deflector whereby the light deflection in the two axial/four directions is implemented but the light deflector whereby the light deflection in the single axial/two directions is implemented. That is, the incident light coming from a single direction is deflected in an object direction (ON direction) and a direction (OFF direction) other than the object as corresponding to the color information.

The white color light from the light source 801 passes through the rod lens 802 so as to be corrected and then is incident on the color wheel 803. The light source light passing through the color wheel becomes the light flux L having red, blue or green in order so that the light flux L lights the light deflection array 804. The light deflectors forming the light deflection array 804 implement the light deflection operation as corresponding to the image information, namely the color information. The light deflectors reflect the reflection light flux Lon in the object direction, for example, a direction perpendicular to the array surface and lead the reflection light flux Lon to the projection lens 807. The reflection light flux Lon passes through the projection lens 807 so that the color information is projected. The color information projected in time order is synthesized by the afterimage of an operator so as to have various kinds of colors. The light flux Loff reflected to a direction other than the object is absorbed by the light absorption plate 806.

SIXTH EXAMPLE

Figure 10:
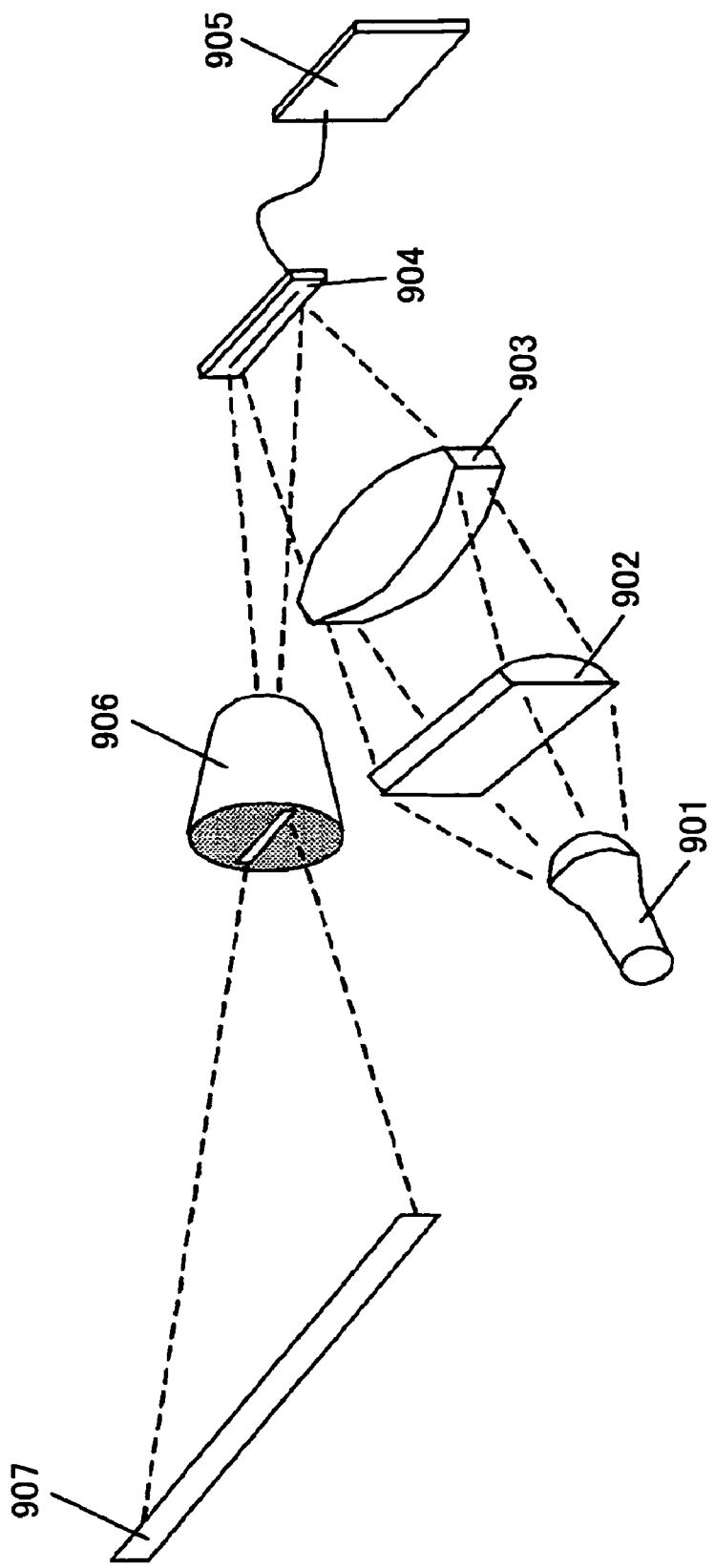
FIG. 10 shows an optical system of a sixth embodiment of the present invention.

FIG. 10 shows an optical system of a sixth example of the present invention. Referring to FIG. 9, a white color light source such as a halogen lamp, xenon lamp, a metal halide lamp, or super high pressure mercury lamp, or a single color light source such as a semiconductor laser, LED or array light source is used for a light source 901.

The light from the light source 901 passes through the optical lens so that light is gathered in a direction perpendicular to a deflection array row and a linear light source is made. Then, the light passes through the optical lens 903 and is gathered on a light deflection array row direction.

The light source light passing through two optical lenses is incident on the light deflection array 904 in an optional direction. The light deflectors forming the light deflection array 904 are individually turned on or off by a signal based on the image information supplied from the control chip 905 so that an object reflection light flux, namely ON light, is led to the projection lens 906. Here, the light deflection array of the third example is used. The reflection light flux led to the projection lens 906 is expand and projected at an optional size by the projection surface 907. In the sixth example, the reflection light flux from the n rows light deflection array is used, the image information of n rows are simultaneously projected.

In the sixth example, the optical system is formed so that the reflection light flux is formed in the vicinity of an incident side of the projection lens. However, the present invention is not limited to this. The optical system may form an image on the light deflection array surface.

Since the light deflection array of the third example is used as the light deflection array for the above-discussed three kinds of the optical systems, it is possible to make high integration of the light deflectors so that a projection optical system having high precision can be provided at low cost.

SEVENTH AND EIGHTH EXAMPLES

Figure 11:
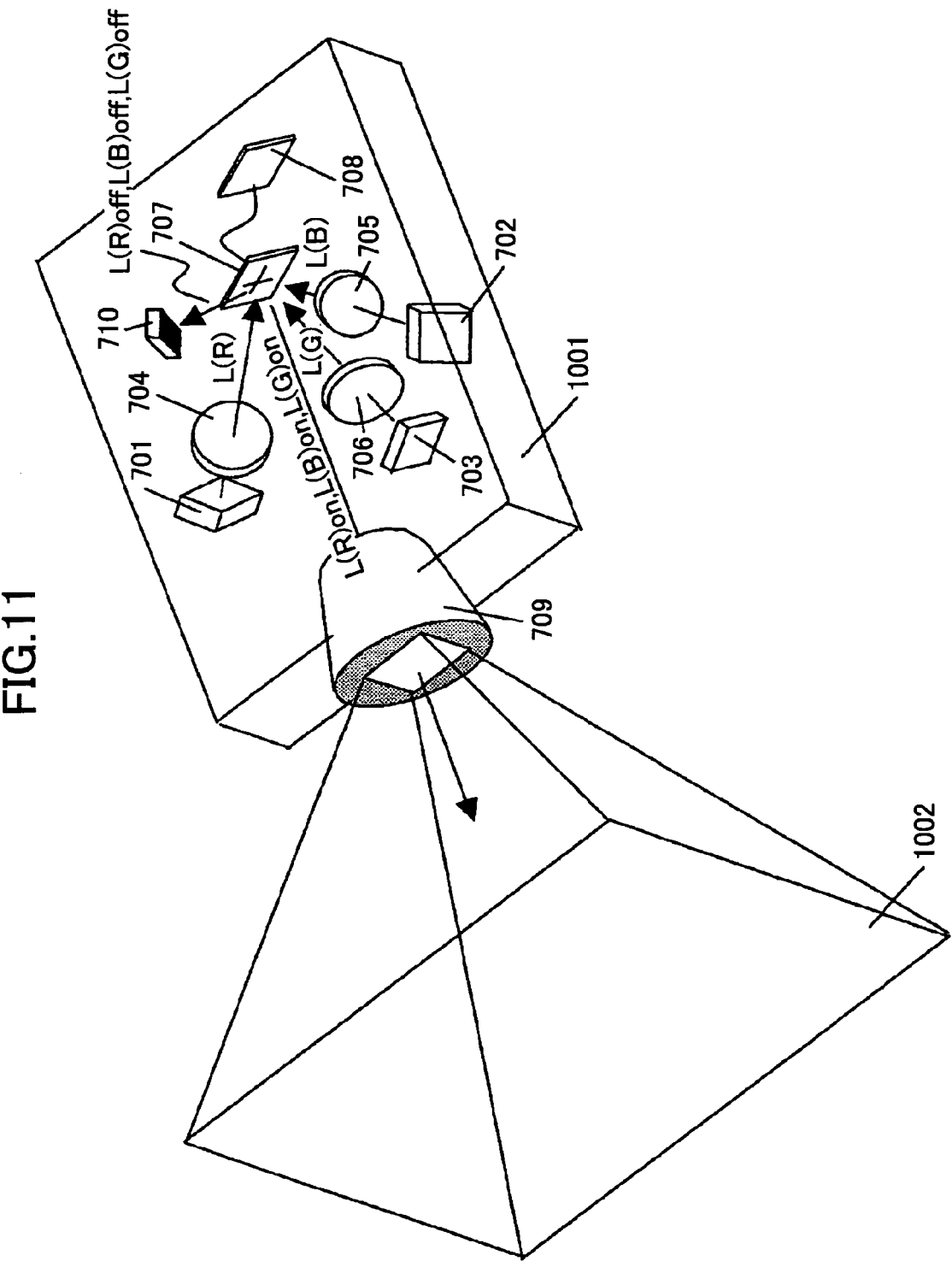
FIG. 11 shows a projection type image display apparatus of a seventh embodiment of the present invention.

FIG. 11 shows a projection type image display apparatus of the seventh example. In a projection type image display apparatus 1001 of FIG. 11, an optical system of the fourth example is used as a projection optical system.

Figure 12:
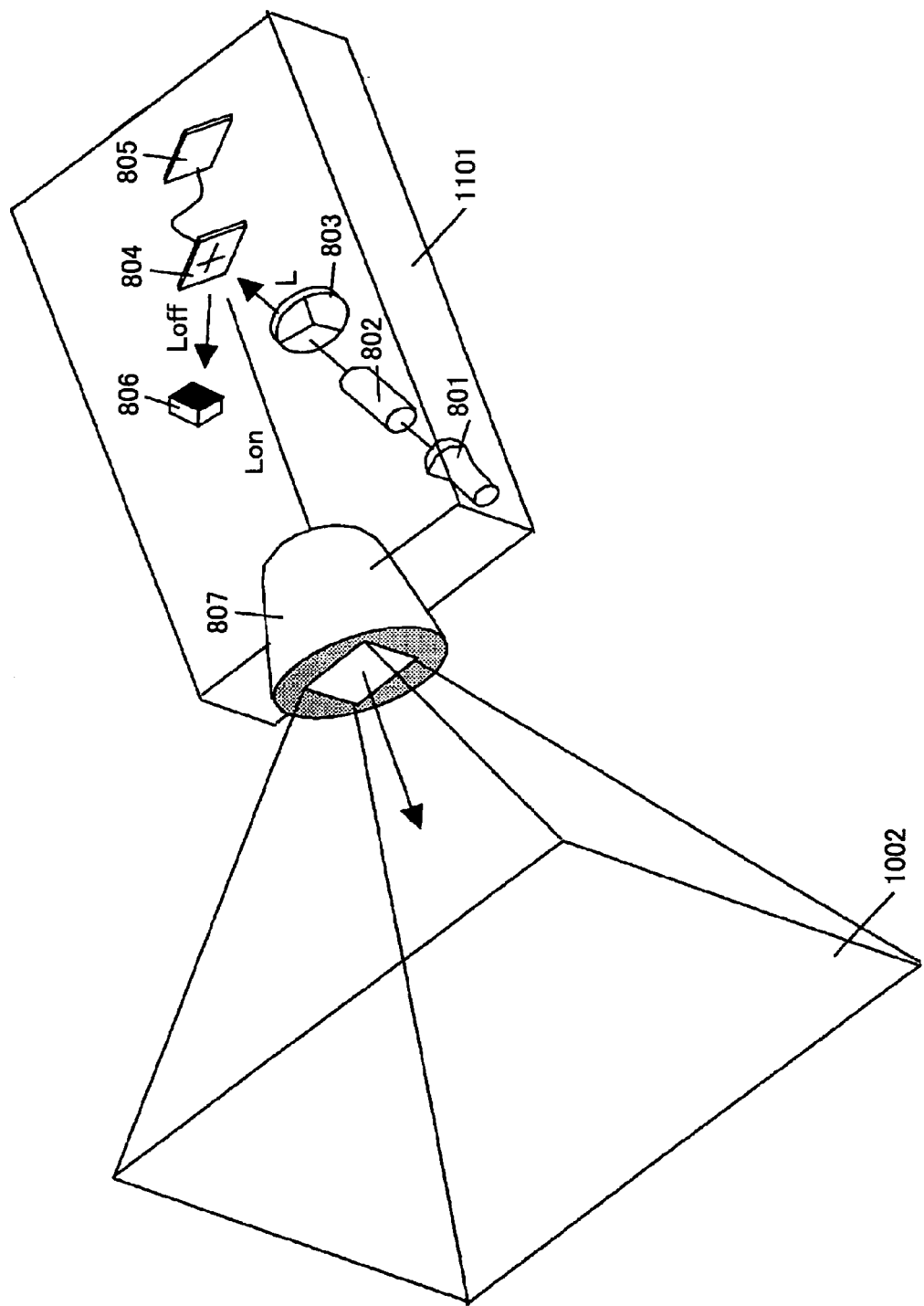
FIG. 12 shows a projection type image display apparatus of an eighth embodiment of the present invention.

FIG. 12 shows a projection type image display apparatus of the eighth example. In a projection type image display apparatus 1101 of FIG. 12, an optical system of the fifth example is used as a projection optical system.

In the seventh and eighth examples, the image information is projected and displayed on a screen 1002 as an image display part via projection lenses 709 and 807, respectively. Since the projection type image display apparatuses of the seventh and eighth examples use the light deflection arrays of the present invention as the display units, it is possible to provide the projection type image display apparatus configured to display the image with high precision at low cost.

NINTH EXAMPLE

Figure 13:
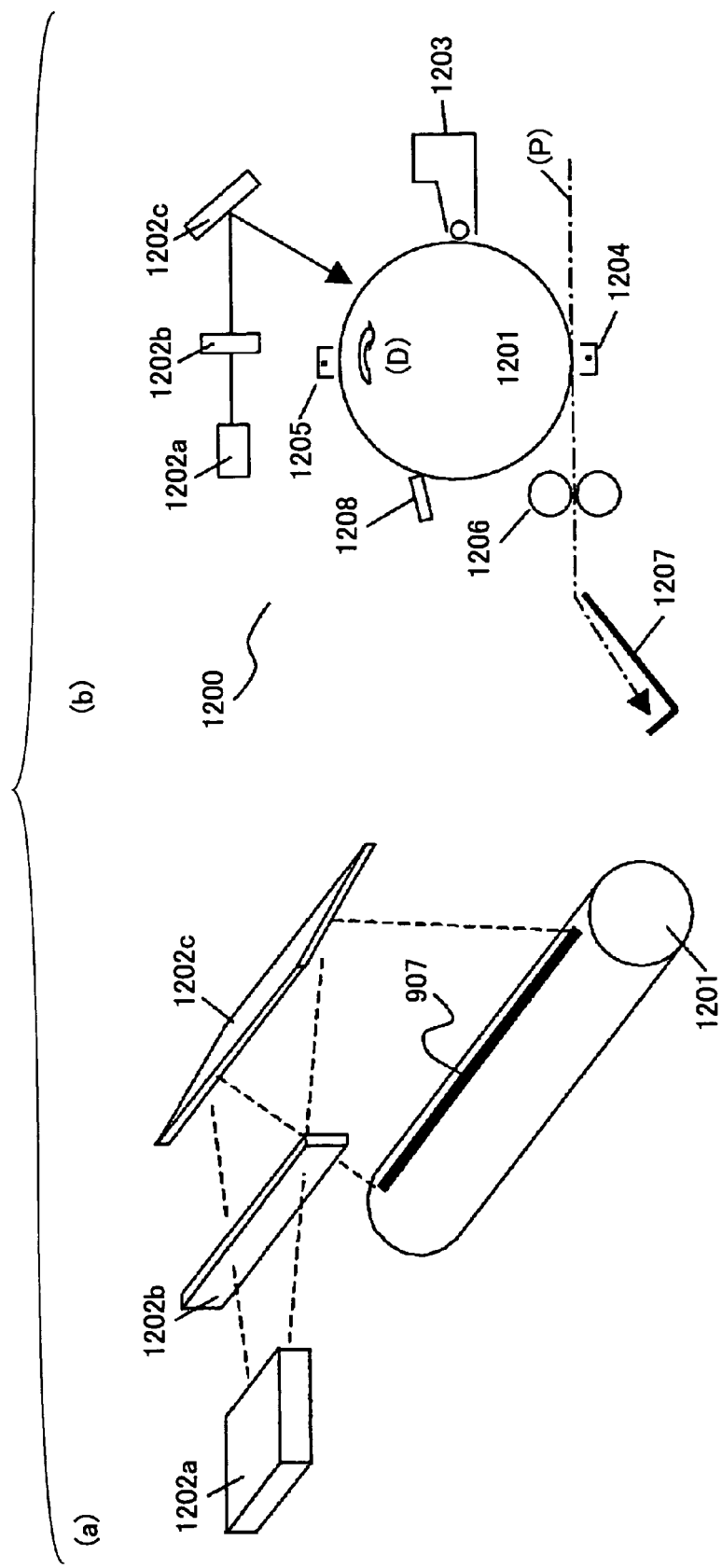
FIG. 13 shows an image forming apparatus of a ninth embodiment of the present invention.

FIG. 13 shows an image forming apparatus of the ninth example. The optical systems of the fourth through sixth examples are used as the optical writing unit in the image forming apparatus of the ninth example. More specifically, FIG. 13(a) is a schematic view of optical writing and FIG. 13(b) is a structural view of the image forming apparatus.

In FIG. 13(a), a reflection light flux corresponding to the n rows image information is projected on an optical system 1202a of the sixth example. The projected reflection light flux row passes through the optical lens 1202b so as to be reflected by a turning reflection mirror 1202c and projected on a line projection surface 907 on an image carrier 1201.

In FIG. 13(b), the image forming apparatus 1200 configured to implement electronic picture type optical writing so that the image is formed, has an image carrier 1201 that is a drum-shaped photosensitive body. The image carrier 1201 held rotatably in a direction shown by an arrow D carries a formed image. Optical writing is performed on the photosensitive body of the image carrier 1201 evenly charged by a charging part 1205 by the optical writing units 1202a, 1202b, and 1202c so that a latent image is formed.

The latent image is developed on the photosensitive body by a developing part 1203, to become a toner image. After that, the toner image is transferred to a transfer body (P) by a transferring part 1204. After the toner image transferred to the transfer body (P) is fixed by a fixing part 1206, the transfer body (P) is discharged and received in a paper discharge tray 1207. On the other hand, the photosensitive body of the image carrier 1201 which has transferred the toner image to the transfer body (P) by the transferring part 1204 is cleaned by a cleaning part 1208 for preparation for image forming in the next process. By using the optical systems of the fourth through sixth examples as the optical writing unit of the image forming apparatus, it is possible to implement the optical writing by the light deflector of the present invention. Hence, it is possible to provide the image forming apparatus whereby the optical writing with high precision can be done at low cost.

TENTH EXAMPLE

Figure 14:
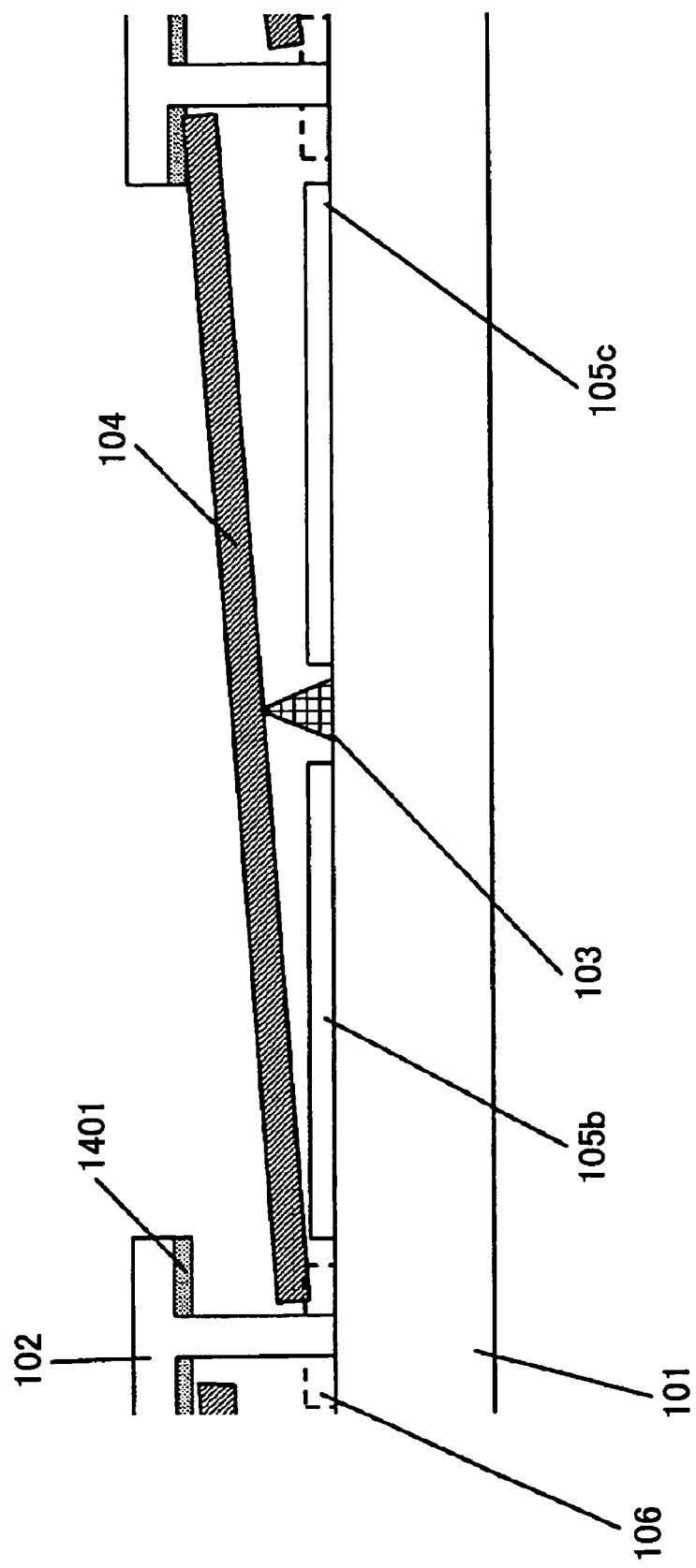
FIG. 14 shows a light deflector of a tenth embodiment of the present invention.

FIG. 14 is a cross-sectional view taken along A-A' of a light deflector of the tenth example. A stopper part 102 as a control member facing the plate-shaped member 104 is formed by a rigid layer 1401 (shown in gray color). The rest of the structure is the same as that of the related art shown in FIG. 1. The rigid layer 1401 is a rigid film and a value of the rigid layer 1401 depends on a measuring method such as a Vickers' method. Since measuring of pushing rigidity by the nano indentation method as the measurement method of rigidity of a thin film has been the general practice in recent years, the rigidity of the rigid layer is measured by the nano indentation method in the present invention.

It is preferable that the rigid layer have rigidity equal to or greater than 15 GPa. In the tenth example, a silicon nitride film having a rigidity of approximately 20 GPa and a titanium nitride film having a rigidity of approximately 15 GPa are used.

It is preferable that the Young's modulus which shows correlation with rigidity, be equal to or greater than 200 GPa. The Young's modulus of the silicon nitride film is approximately 280 through 380 GPa and the Young's modulus of the titanium nitride film is approximately 200 through 300 GPa.

The rigid layer 1401 such as the silicon nitride film or the titanium nitride film is not mechanically deformed, at the waiting time of the light deflector, by the force applied when the plate-shaped member 104 comes in contact with the stopper 102. Hence, the increase of the contact area and the increase of the contact distance are prevented so that the increase of the fixing force is prevented.

Since the silicon nitride film is used for a passivation film in a normal LSI manufacturing process, the silicon nitride film is proper for manufacturing with the LSI. In addition, since the titanium nitride film is used for a metal wiring in the normal LSI manufacturing process, the titanium nitride film is proper for manufacturing with the LSI. Furthermore, since the titanium nitride film has the film thickness of approximately 100 nm and the reflection ratio of approximately 20 through 60% (depending on the wave length), an unnecessary irregular reflection light from the substrate can be blocked. However, since the reflection light from the plate-shaped member 104 is also blocked, the numerical aperture of the projected image information is decreased.

Because of this, in a case where the optical system requires a high brightness or a high numerical aperture, the silicon nitride film is used. In a case where the optical system requires a high contrast ratio, the titanium nitride film is used so that the irregular reflection light can be prevented and the OFF light can be reduced. The rigid layer of the present embodiment is not limited to the above-discussed the silicon nitride film or the titanium nitride film. For example, the rigid layer may be an aluminum oxide film, silicon carbide film, or tungsten film.

Next, a manufacturing method of the light deflector of the tenth example of the present invention is discussed with reference to FIG. 15. Processes that are not explained in FIG. 15 are the same as those discussed in Japanese Laid-Open Patent Application Publication No. 2004-78136.

Figure 15:
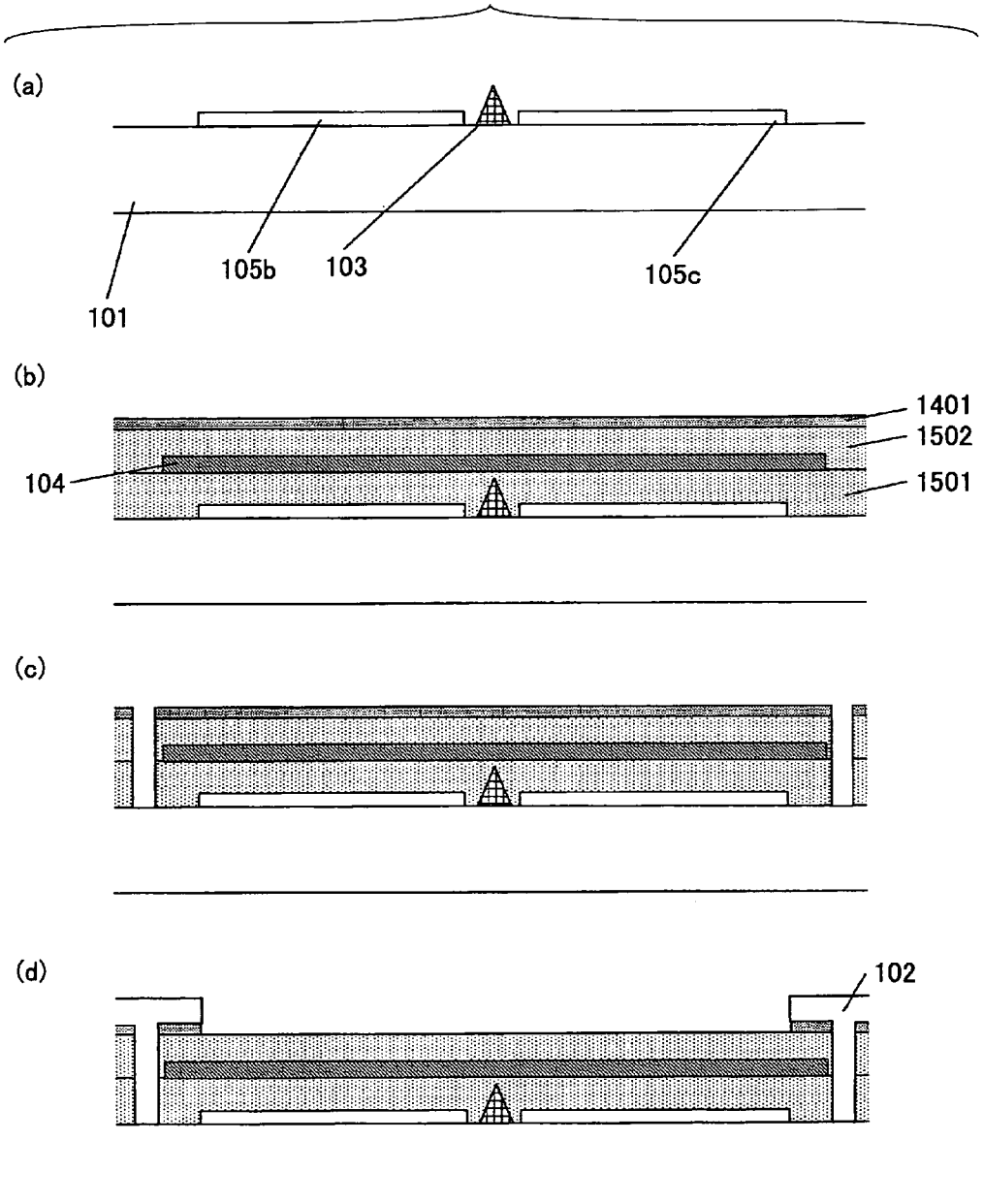
FIG. 15 shows a manufacturing method of the light deflector of the tenth embodiment of the present invention.

FIG. 15 is a cross-sectional view taken along A-A' of the light deflector of the tenth example. The fulcrum member 103, plural electrodes 105a through 105dm and the contact part 106 not shown in FIG. 15(a) are provided on the substrate 101 as shown in FIG. 15(a).

Next, as shown in FIG. 15(b), the first sacrifice layer 1501, the plate-shaped member 104, the second sacrifice layer 1502 and the rigid layer 1401 are provide on the substrate in this order.

In the first sacrifice layer 1501 and the second sacrifice layer 1502, novolac resin is formed by a spin coating method. The first sacrifice layer 1501 and the second sacrifice layer 1502 are flattened by a thermal process.

The plate-shaped member 104 is formed by stacking the high reflection film and the high elastic coefficient film by the sputtering method and patterning as corresponding to the pixels.

The rigid film 1401 is formed by the plasma CVD method in the case of the silicon nitride film and is formed by the sputtering method in the case of the titanium nitride film. Although an organic film is used as a film seed of the sacrifice layers of the present invention, the silicon film or the silicon oxide film may be used. A stacking method of the film is not discussed above.

Next, as shown in FIG. 15(c), the first sacrifice layer 1501, the plate-shaped member 104, the second sacrifice layer 1502 and the rigid layer 1401 are patterned by the same photo mask.

Next, as shown in FIG. 15(d), the control member 102 is stacked and the patterning is made by the same photo mask as the rigid layer 1401 so that the stopper part partially having the rigid layer is formed. After that, the sacrifice layers 1501 and 1502 are etched and removed so that the light deflector is completed.

ELEVENTH EXAMPLE

Figure 16:
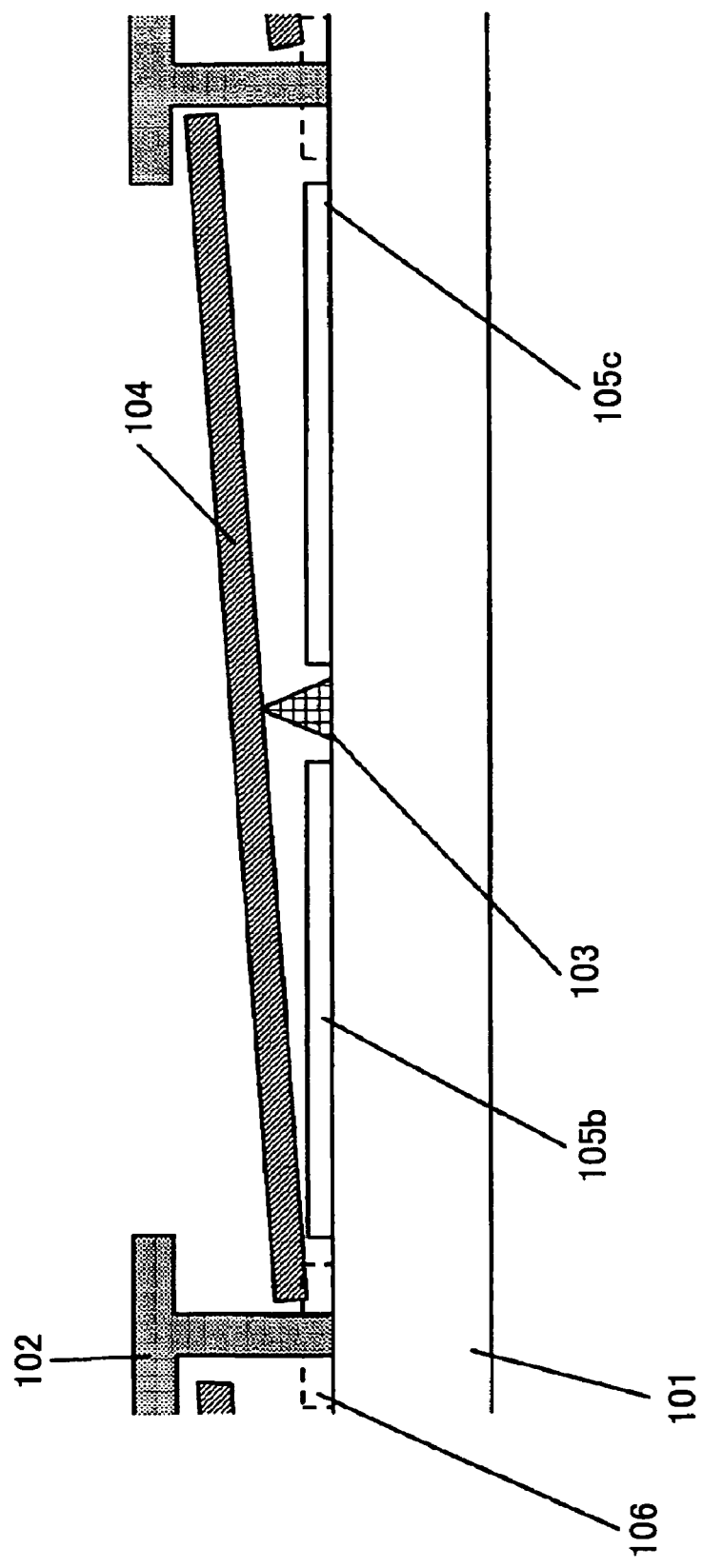
FIG. 16 shows a light deflector of an eleventh embodiment of the present invention.

FIG. 16 shows an image forming apparatus of the eleventh example of the present invention. The difference in structures between the eleventh example and the tenth example is that the control member 102 having the stopper 102 in the eleventh example is formed by the rigid layer shown in gray. It is preferable that the rigid layer be an insulation layer for preventing electrical shorts between the neighboring plate-shaped members. In the eleventh example, the silicon nitride film is used as the rigid layer.

TWELFTH EXAMPLE

FIG. 17 shows a light deflection array where plural light deflectors are arranged in a two-dimensional array. FIG. 17(a) is a plan view of the light deflection array of the twelfth example of the present invention. FIG. 17(b) is a cross-sectional view taken along a line A-A' of FIG. 17(a).

In the twelfth example, the light deflectors of the present embodiment are arranged in m lines×n rows so that the light deflectors implement the light deflection operation based on the supplied driving signals. Since the low voltage driving of the light deflector can be done at the time of the light deflection operation, the supplied driving signal becomes low voltage.

The driving signal is stored in the semiconductor memory circuit provided under the light deflector so that all of the light deflectors are simultaneously deflected. For example, as discussed in Japanese Patent Application No. 2004-320821, data designating a tilt direction of the plate-shaped member is input and stored in the semiconductor memory circuit. The cell output of the semiconductor memory circuit is connected to the electrode to which electric potential of the conductive layer of the plate-shaped member of the corresponding light deflector is supplied.

According to this example, it is possible to use a low voltage driving signal and a memory circuit which can be driven at a low voltage, such as a 3V driving SRAM, as the semiconductor memory circuit. Since the low voltage driving SRAM has an occupied area equal to or less than 100 µm², the low voltage driving SRAM contributes to making the light deflection array small with high integration and therefore it is possible to increase the number of the SRAMs (array number) in a single silicon wafer so that the manufacturing cost can be reduced.

THIRTEENTH EXAMPLE

Figure 18:
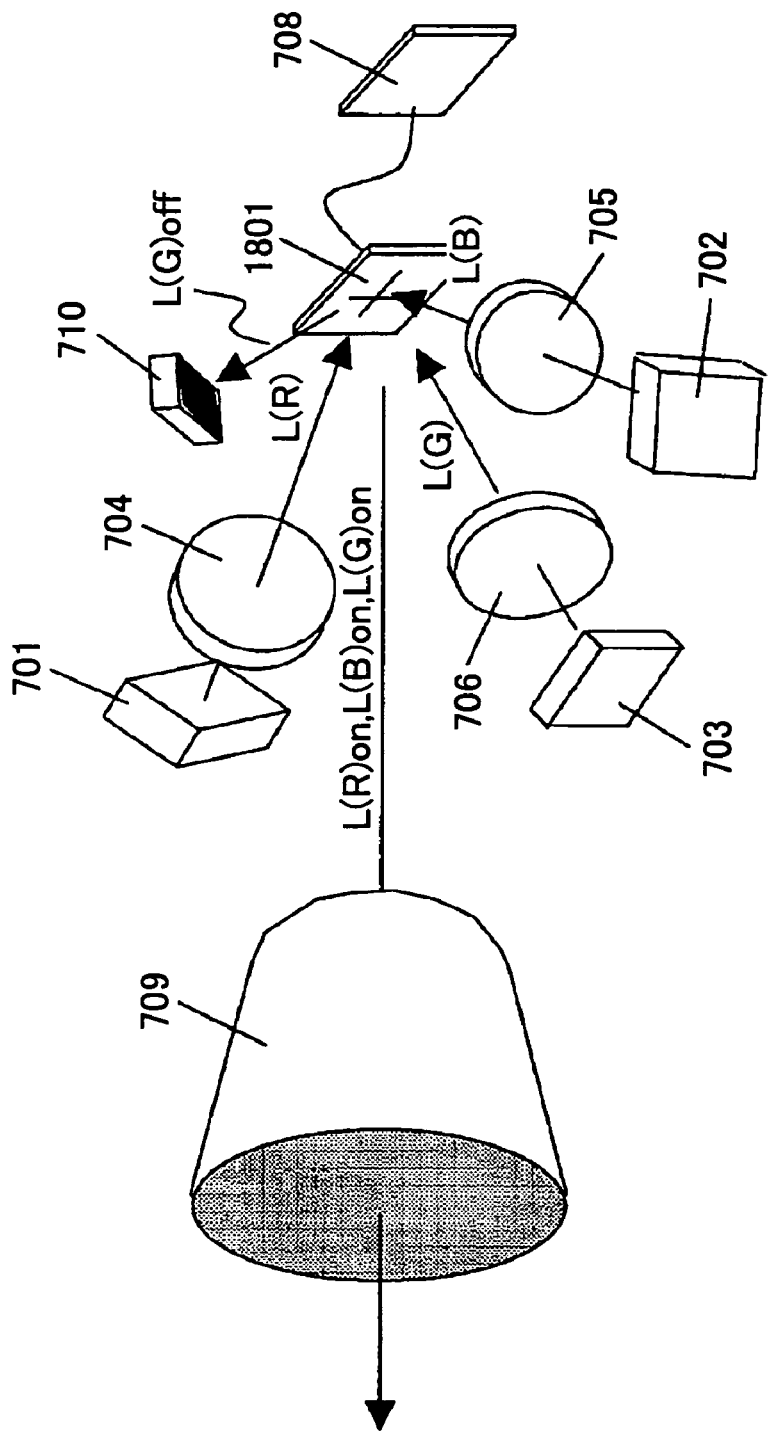
FIG. 18 shows an optical system of a thirteenth embodiment of the present invention.

FIG. 18 shows an optical system of the thirteenth example. The optical system of the thirteenth example is based on the optical system used in the projection type image display apparatus invented by the inventor of the present invention and disclosed in Japanese Laid-Open Patent Application Publication No. 2004-138881. In other words, the light deflection array can deflect light in the two axial/four directions and three light source lights corresponding to the RGB three primary colors are reflected to a direction perpendicular to the array surface based on the image information so as to lead the projection lens and be projected and displayed. The timing for switching the light deflection direction for displaying the colors is discussed in Japanese Laid-Open Patent Application Publication No. 2004-138881.

The optical system of the thirteenth example has three primary color light sources (red 701, blue 702, and green 703) lighting the light deflection array 1801 of the thirteenth example. The three primary color lights are irradiated toward a single light deflection array 1801 from the primary color light sources (red 701, blue 702, and green 703). As the light sources of the three primary colors, array light sources such as LD light sources or LED light sources are used.

Three primary colors lights L(R), L(G) and L(B) pass through corrective lenses 704, 705 and 706 so that brightness distribution of the light sources or directivity is improved, an aperture is arranged, and the lights are corrected into rectangular shapes. The corrected three primary colors lights L(R), L(G) and L(B) come into a single light deflection array 1801 in different directions.

The light deflection directions of the light deflectors form the light deflection array 1801 whereby the light deflection in the two axial/four directions are applied to red information display, blue information display, green information display, and non color-display (OFF operation).

As corresponding to image information, namely color information of respective colors, three primary color lights are reflected in the direction perpendicular to the array surface so as to be led to the projection lens 709 for projection display.

At the time of black display, namely the OFF operation, the three primary colors lights are not reflected in a direction perpendicular to the array surface. A part of the lights such as the L(G) light in FIG. 18, is reflected to a direction different from an object and absorbed in a light absorption plate 710. The light absorption plate 710 may be arranged as corresponding to the three primary colors lights.

For displaying the color information of the pixels, it is necessary for the light deflectors forming the light deflection array to determine the direction. A control for the determination is implemented by a control chip or control board 708 connected to the light deflection array 1801.

The optical system of the present invention is a small and simple optical system wherein a color wheel is not used and image projection can be made by a single light deflection array. Therefore, since the LD, LED or array light source is used as the light source, the amount of heat is small and the optical system is small and has low consumption electric power. The optical system does not need a fan for cooling.

FOURTEENTH EXAMPLE

Figure 19:
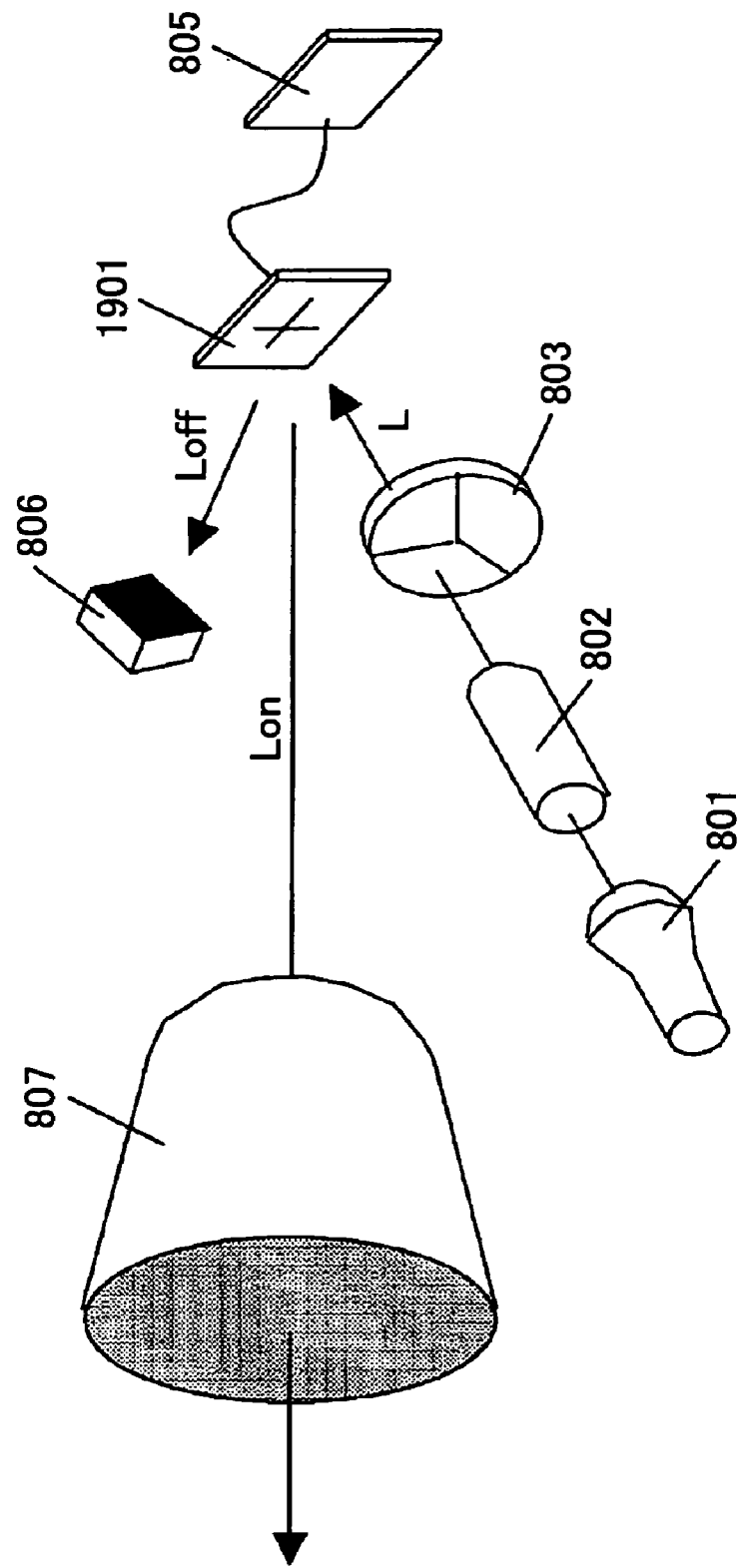
FIG. 19 shows an optical system of a fourteenth embodiment of the present invention.

FIG. 19 shows an optical system of a fourteenth example of the present invention. The optical system of the fourteenth example of the present invention is based on the optical system used for the projection type image display apparatus discussed in Japanese Laid-Open Patent Application Publication No. 2004-78136. This projection type image display apparatus time-divisionally displays the three primary colors by using a color wheel.

The optical system shown in FIG. 19 has a white color light source 801 such as a halogen lamp or a xenon lamp, a rod lens 802 for correcting a light source light, a color wheel 803 having at least three primary colors color filter, the light deflection array 1901, a control chip 805 configured to control the light deflection direction of the light deflectors forming the light deflection array, a light absorption plate 806, and a projection lens 807.

The light deflector forming the light deflection array 1901 used for the optical system of the fourteenth example of the present invention is not the light deflector whereby the light deflection in the two axial/four directions is implemented but the light deflector whereby the light deflection in the single axial two directions is implemented. That is, the incident light coming from a single direction is deflected in an object direction (ON direction) and a direction (OFF direction) other than the object as corresponding to the color information.

The white color light from the light source 801 passes through the rod lens 802 so as to be corrected and then is incident on the color wheel 803. The light source light passing through the color wheel becomes the light flux L having red, blue or green in order so that the light flux L is incident on the light deflection array 1901. The light deflectors forming the light deflection array 1901 implement the light deflection operation as corresponding to the image information, namely the color information. The light deflectors reflect the reflection light flux Lon in the object direction, for example, a direction perpendicular to the array surface and lead the reflection light flux Lon to the projection lens 807. The reflection light flux Lon passes through the projection lens 807 so that the color information is projected. The color information projected in time order is synthesized by the afterimage of an operator so as to have various kinds of colors. The light flux Loff reflected to a direction other than the object is absorbed by the light absorption plate 806.

FIFTEENTH EXAMPLE

Figure 20:
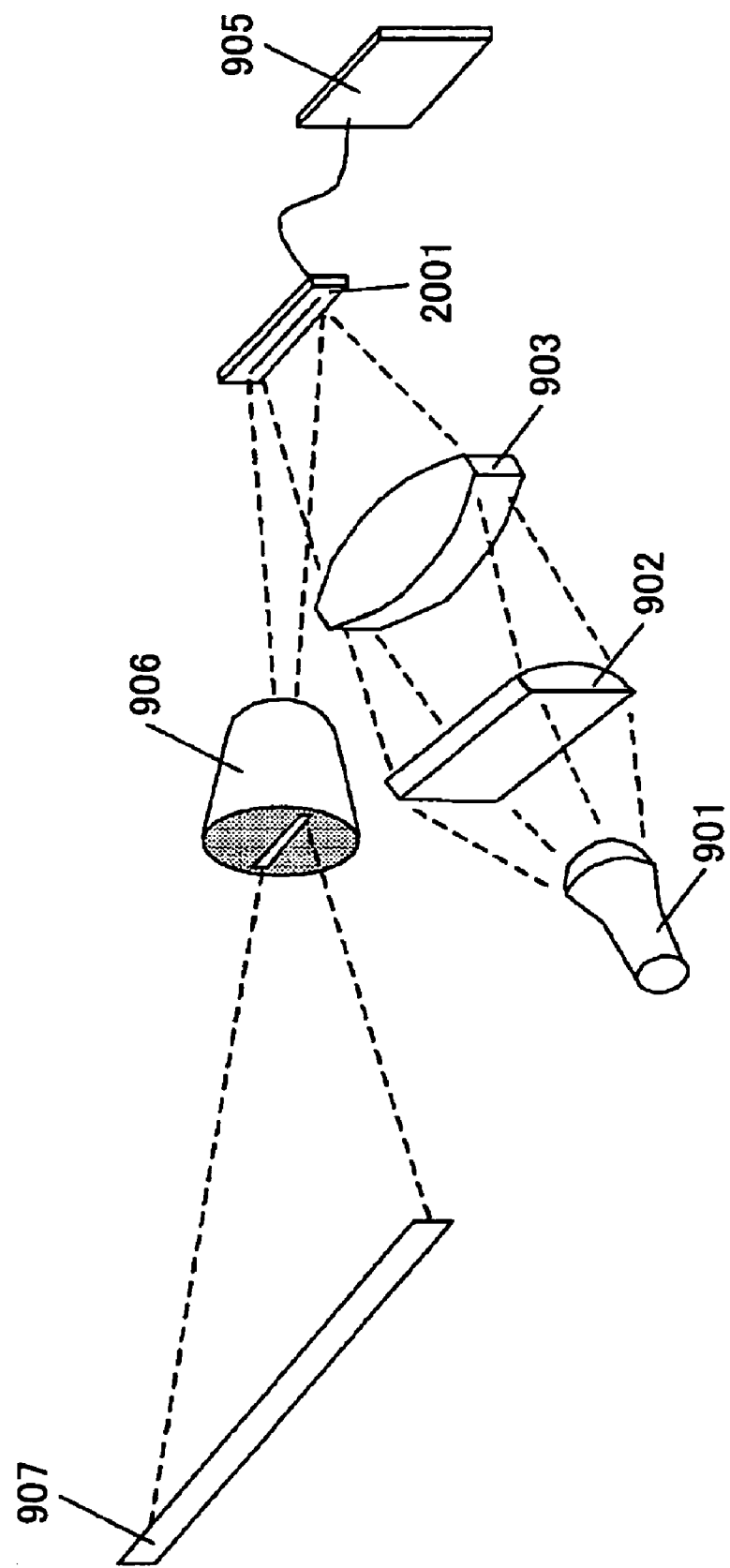
FIG. 20 shows an optical system of a fifteenth embodiment of the present invention.

FIG. 20 shows an optical system of a fifteenth example of the present embodiment. Referring to FIG. 20, a white color light source such as a halogen lamp, xenon lamp, a metal halide lamp, or super high pressure mercury lamp, or a single color light source such as a semiconductor laser, LED or array light source is used for a light source 901.

The light source light from the light source 901 passes through the optical lens so that light is gathered in a direction perpendicular to a deflection array row and a linear light source is made. Then, the light passes through the optical lens 903 and is gathered on a light deflection array row direction.

The light source light passing through two optical lenses is incident on the light deflection array 2001 in an optional direction. The light deflectors forming the light deflection array 2001 are individually turned on or off by a signal based on the image information supplied from the control chip 905 so that an object reflection light flux, namely ON light, is led to the projection lens 906. Here, the light deflection array of the twelfth example (an array arranged in one dimensional state wherein m=1) is used. The reflection light flux led to the projection lens 906 is expanded and projected at an optional size by the projection surface 907. In the fifteenth example, the reflection light flux from the n rows light deflection array is used, so that the image information of n rows is simultaneously projected.

In the fifteenth example, the optical system is formed so that the reflection light flux forms an image in the vicinity of an incident side of the projection lens. However, the present invention is not limited to this. The optical system may form an image on the light deflection array surface.

Since the light deflection array of the twelfth example is used as the light deflection array for the above-discussed three kinds of the optical systems, it is possible to make high integration of the light deflectors at low cost so that a projection optical system having high precision can be provided at low cost.

SIXTEENTH AND SEVENTEENTH EXAMPLES

Figure 21:
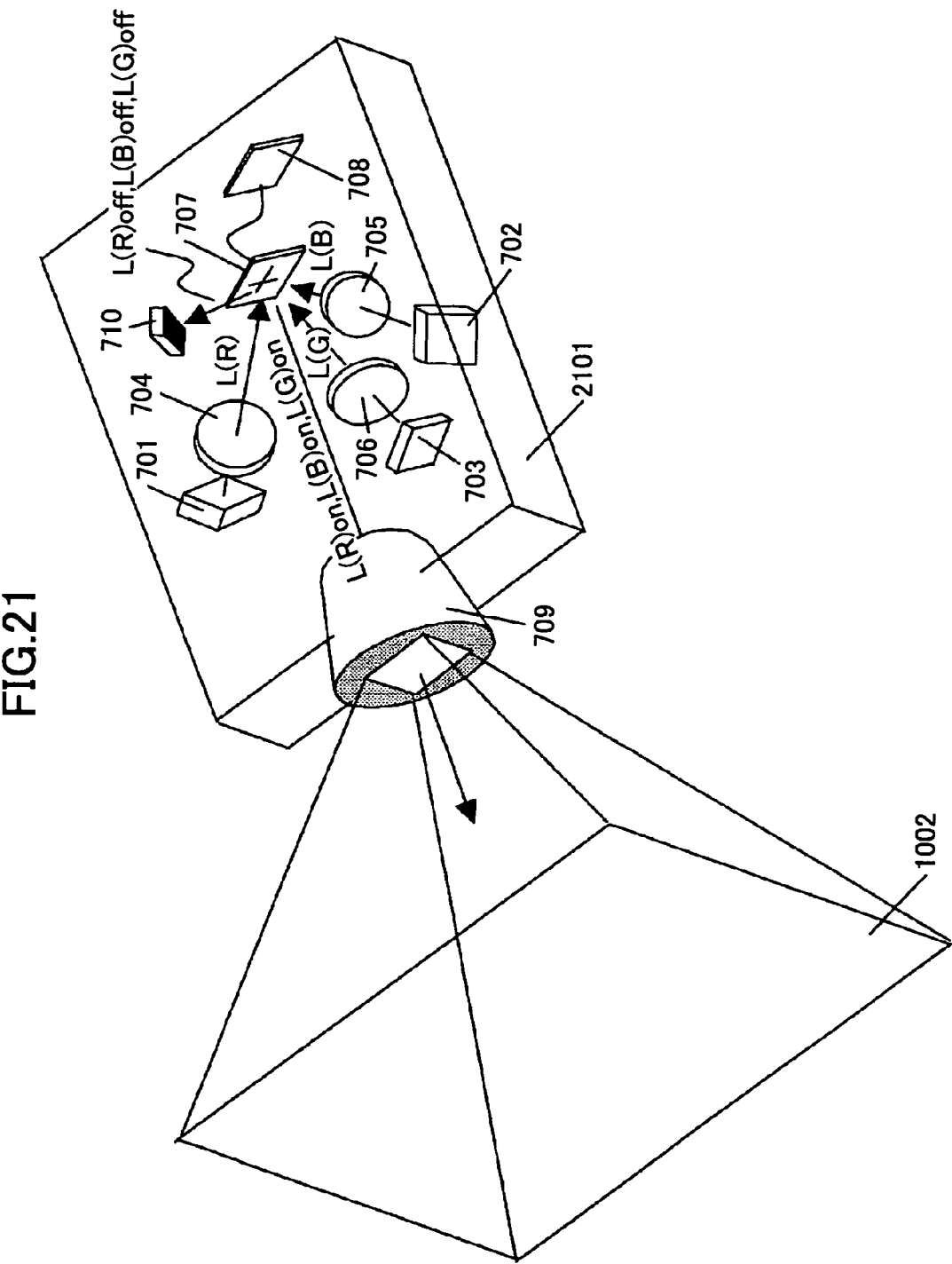
FIG. 21 shows projection type image display apparatus of a sixteenth embodiment of the present invention.

FIG. 21 shows a projection type image display apparatus of the sixteenth example. In a projection type image display apparatus 2101 of FIG. 21, an optical system of the fourth example is used as a projection optical system.

Figure 22:
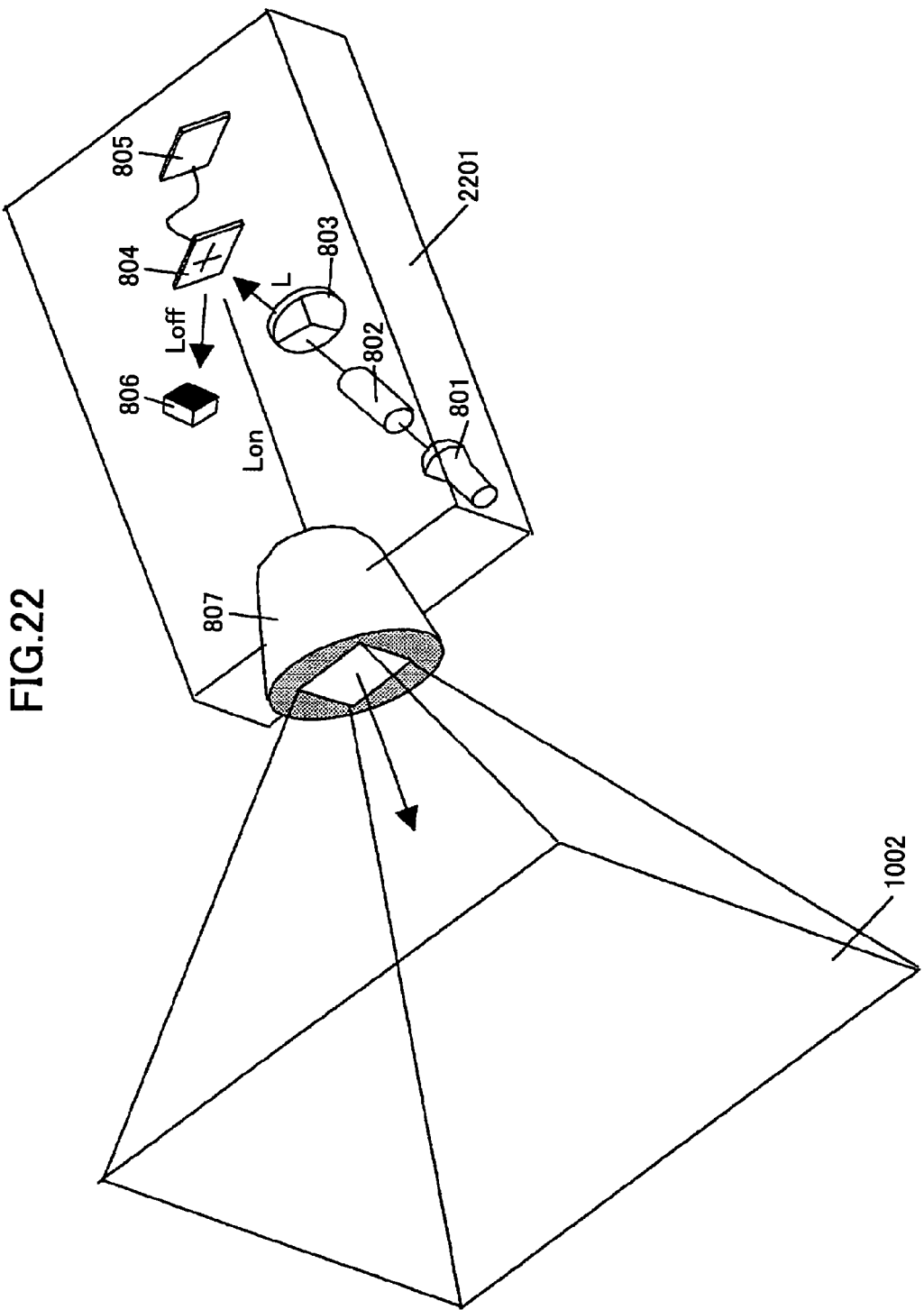
FIG. 22 shows projection type image display apparatus of a seventeenth embodiment of the present invention.

FIG. 22 shows a projection type image display apparatus of the seventeenth example. In a projection type image display apparatus 2201 of FIG. 22, an optical system of the fifth example is used as a projection optical system.

In the sixteenth and seventeenth examples, the image information is projected and displayed on a screen 1002 as an image display part via projection lenses 709 and 807, respectively. Since the projection type image display apparatuses of the sixteenth and seventeenth examples uses the light deflection arrays of the present invention as the display units, it is possible to provide the projection type image display apparatus configured to display the image with high precision at low cost.

EIGHTEENTH EXAMPLE

Figure 23:
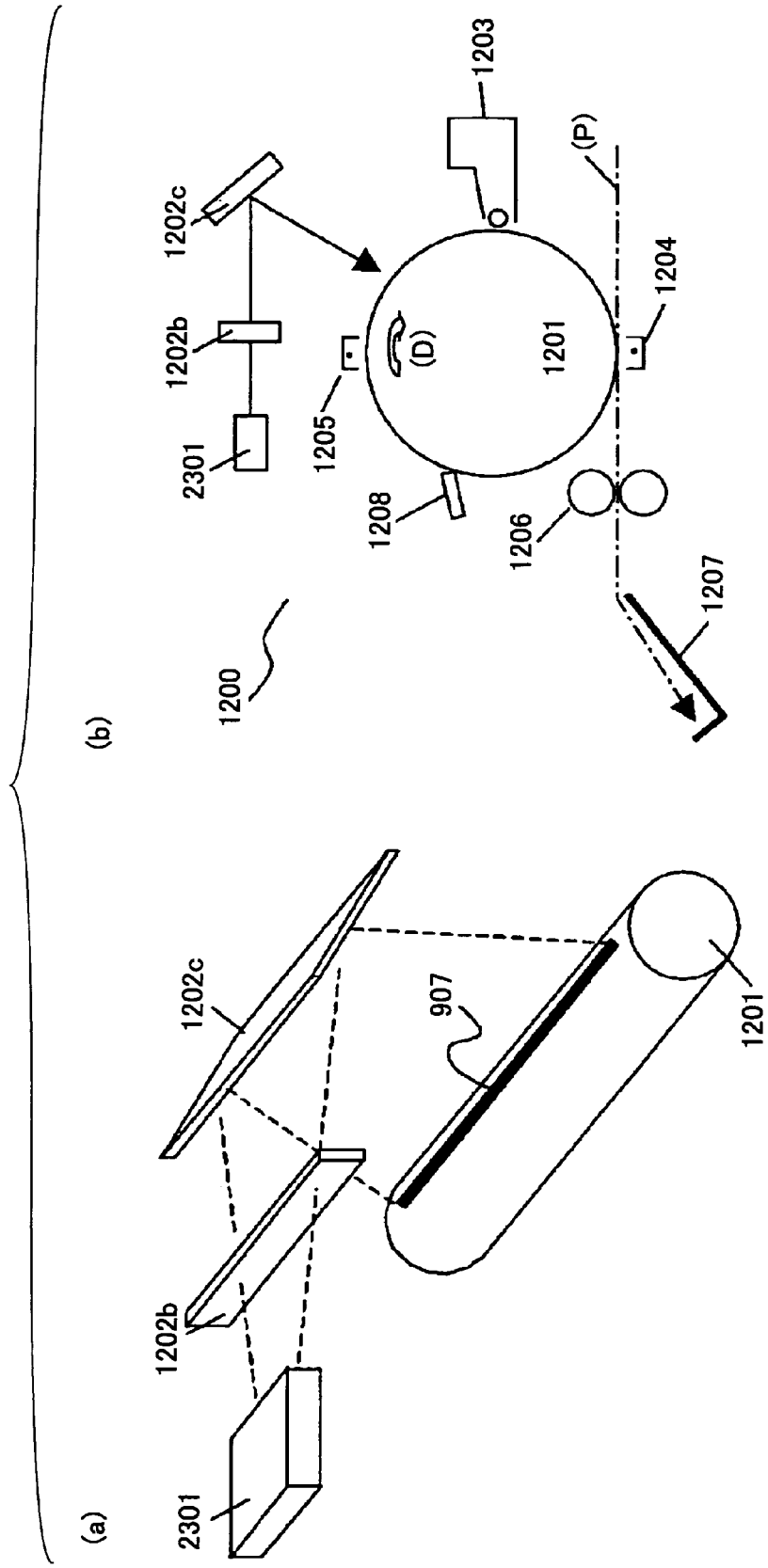
FIG. 23 shows an image forming apparatus of an eighteenth embodiment of the present invention.

FIG. 23 shows an image forming apparatus of the eighteenth example. The optical systems of the thirteenth through fifteenth examples are used as the optical writing unit in the image forming apparatus of the eighteenth example. More specifically, FIG. 23(*a*) is a schematic view of optical writing and FIG. 23(*b*) is a structural view of the image forming apparatus.

In FIG. 23(*a*), a reflection light flux corresponding to the n rows image information is projected on an optical system 2301 of the fifteenth example. The projected reflection light flux row passes through the optical lens 1202*b* so as to be reflected by a turning reflection mirror 1202*c* and projected on a line projection surface 907 on an image carrier 1201.

In FIG. 23(*b*), an image forming apparatus 1200 forms an image by light-writing based on an electronic picture process. The image forming apparatus 1200 includes a drum-shaped photosensitive body of an image carrier 1201. The image carrier is rotatably held in a direction indicated by an arrow D and carries formed images. The photosensitive body of the image carrier is electrically charged evenly by an electric charge device 1205. Light-writing is performed on the photosensitive body by the light writing unit 2301, 1202*b* and 1202*c* so that a latent image is formed.

The latent image is formed on the photosensitive body as a toner image by a developing device 1203. And then, the toner image is transferred to a transfer body (P) by a transferring device 1204. After the toner image transferred to the transfer body (P) is fixed by a fixing device 1206, the transfer body (P) is discharged to a discharging tray 1207 to be stored. On the other hand, the photosensitive body of the image carrier 1201, after the toner image is transferred to the transfer body (P) by the transferring device 1204, is cleaned by a cleaning device 1208 so as to be prepared for the next image forming process.

By using the optical systems of the thirteenth through fifteenth examples as the optical writing unit of the image forming apparatus, it is possible to implement the optical writing by the light deflector of the present invention. Hence, it is possible to provide the image forming apparatus whereby the optical writing with high precision can be done at low cost.

Thus, according to the embodiment of the present invention, it is possible to provide a light deflector, including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is possible to prevent the thermal or mechanical deformation of the forming member, increase of the contact area, and the increase of the fixing force, by the force whereby the optional part on the substrate is pushed when the plate-shaped member is tilted and displaced due to the electrostatic attraction. As a result of this, it is possible to achieve the low voltage driving of the light deflector.

The optional part, formed at the substrate, with which optional part the plate-shaped member comes in contact, may be a contact part provided on the substrate or the fulcrum member.

The optional part formed on the substrate where the plate-shaped member comes in contact is the contact part provided on the substrate or the fulcrum member. A part where the pushing force by the electrostatic attraction is concentrated is formed by the layer whose main ingredient is the high melting point metal element. As a result of this, it is possible to efficiently prevent the increase of the fixing force so that the low voltage driving can be achieved. In addition, in a case where the layer whose main ingredient is the high melting point metal element has conductivity, by providing the optional part to the fulcrum part or the contact part, it is possible to provide the electrical insulation with other forming parts.

The layer whose main ingredient may be the high melting point metal element is made of tungsten.

Since the layer whose main ingredient is the high melting point metal element is made of tungsten and has high heating resistance and high rigidity, the deformation by the pushing force due to the electrostatic attraction is small. Hence, it is possible to efficiently prevent the increase of the fixing force and achieve the low voltage driving of the light deflector.

The layer whose main ingredient may be the high melting point metal element is made of a titanium nitride film.

The layer whose main ingredient is the high melting point metal element is made of the titanium nitride film having high rigidity. In addition, this layer is generally used for the manufacturing process of the semiconductor device such as the LSI. Hence, this layer is proper for manufacturing with the LSI and can be simultaneously processed by an aluminum group metal film and chlorine group gas used for a mirror material. As a result of this, it is possible to easily prevent the increase of the fixing force so that the low voltage driving can be achieved.

According to the embodiment of the present invention, it is possible to provide a light deflection array wherein a plurality of light deflectors is arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

The semiconductor memory circuit, storing the driving signal for determining the deflection direction of the light deflector, driven at the low voltage, is formed right below the light deflector. Hence, it is possible to provide the small size light deflection array having high integration at low cost.

According to the embodiment of the present invention, it is possible to provide an optical system, including:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is possible to realize the projection of images with high precision at low cost by this optical system.

According to the embodiment of the present invention, it is possible to provide a projection type image display apparatus using an optical system as a projection optical system, the optical system including:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is possible to realize display of images with high precision at low cost by this projection type image display apparatus.

According to the embodiment of the present invention, it is possible to provide a projection type image display apparatus using an optical system as a optical writing unit, the optical system including:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part, formed at the substrate, with which optional part the plate-shaped member comes in contact, is made of a layer whose main ingredient is a high melting point metal element.

It is possible to provide the optical writing unit configured to write the images with high precision on the photosensitive body at low cost.

According to the embodiment of the present invention, it is possible to provide a light deflector, including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force where the fulcrum member is a center, so that a reflection direction of a light flux incident on the light reflection area is changed and thereby light deflection is performed; and an optional part, formed at the plate-shaped member, with which optional part the substrate comes in contact, is made of a layer whose main ingredient is a high melting point metal element.

Since the layer whose main ingredient is a high melting point metal element is provided at the optional part formed on the substrate but also on the plate-shaped member, it is possible to efficiently prevent the increase of the fixing force so that the low voltage driving can be achieved.

According to the embodiment of the present invention, it is possible to provide a light deflector, including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stopper, the plate-shaped member having a light reflection area, no fixed end, and a conductive layer; and a plurality of electrodes provided on the substrate, the electrodes facing the conductive layer of the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and an optional part of the stopper facing the plate-shaped member is made of a rigid layer.

It is possible to prevent the thermal or mechanical deformation of the forming member, increase of the contact area, and the increase of the fixing force, by the collision energy when the plate-shaped member having no fixed end collides with the stopper at an irregular speed at the waiting time. As a result of this, it is possible to achieve the low voltage driving of the light deflector.

The rigid layer may be a silicon nitride film.

The silicon nitride film has high rigidity and is generally used for the manufacturing process of the semiconductor device such as the LSI. Hence, this layer is proper for manufacturing with the LSI.

The rigid layer may be a titanium nitride film.

The titanium nitride film has high rigidity and is generally used for the manufacturing process of the semiconductor device such as the LSI. Hence, this layer is proper for manufacturing with the LSI. In addition, this film has a high blocking ability against the light, so that it is possible to prevent irregular reflection from the substrate.

The present invention is not limited to the above-discussed embodiments, but variations and modifications may be made without departing from the scope of the present invention.

This patent application is based on Japanese Priority Patent Application No. 2005-122422 filed on Apr. 20, 2005 and Japanese Priority Patent Application No. 2006-37914 filed on Feb. 15, 2006, the entire contents of which are hereby incorporated by reference.

What is claimed is:

1. A light deflector, comprising:
   a substrate;
   a plurality of control members provided at edge parts of the substrate, the control members having upper parts where stoppers are situated;
   a fulcrum member provided on an upper surface of the substrate, the fulcrum member having a top part;
   a plate-shaped member movably provided in a space formed by the substrate, the fulcrum member and the stoppers, the plate-shaped member having a light reflection area and no fixed end; and
   a plurality of electrodes provided on the substrate, the electrodes facing the plate-shaped member;
   wherein the plate-shaped member is tilted and displaced by an electrostatic attraction force in a state where the fulcrum member is a center, so that a reflection direction of a light flux incident on the light reflection area is changed and thereby light deflection is performed; and
   wherein the substrate includes a contact part formed thereon which contacts the plate-shaped member, the contact part including an upper layer and a lower layer, and the upper layer and not the lower layer is made of a main ingredient which is a high melting point metal element.

2. The light deflector as claimed in claim 1,
   wherein the fulcrum member includes an upper layer and a lower layer, and the upper layer and not the lower layer of the fulcrum member is made of a main ingredient which is a high melting point metal element.

3. The light deflector as claimed in claim 1,
   wherein the layer whose main ingredient is the high melting point metal element is made of tungsten.

4. The light deflector as claimed in claim 1,
   wherein the layer whose main ingredient is the high melting point metal element is made of a titanium nitride film.

5. A light deflection array wherein a plurality of light deflectors is arranged in one dimension or two dimensions,
   the light deflector comprising:
   a substrate;
   a plurality of control members provided at edge parts of the substrate, the control members having upper parts where stoppers are situated;
   a fulcrum member provided on an upper surface of the substrate, the fulcrum member having a top part;
   a plate-shaped member movably provided in a space formed by the substrate, the fulcrum member, and the stoppers, the plate-shaped member having a light reflection area and no fixed end; and
   a plurality of electrodes provided on the substrate, the electrodes facing the plate-shaped member;
   wherein the plate-shaped member is tilted and displaced by an electrostatic attraction force in a state where the fulcrum member is a center, so that a reflection direction of a light flux incident on the light reflection area is changed and thereby light deflection is performed; and
   wherein the substrate includes a contact part formed thereon which contacts the plate-shaped member, the contact part including an upper layer and a lower layer, and the upper layer and not the lower layer is made of a main ingredient which is a high melting point metal element.

6. An optical system, comprising:
   a light deflection array;
   a light source configured to light the light deflection array; and
   a projection lens configured to project a reflection light from the light deflection array as corresponding to color information;
   wherein the light deflection array has a plurality of light deflectors which light deflectors are arranged in one dimension or two dimensions,
   the light deflector including:
   a substrate;
   a plurality of control members provided at edge parts of the substrate, the control members having upper parts where stoppers are situated;
   a fulcrum member provided on an upper surface of the substrate, the fulcrum member having a top part;
   a plate-shaped member movably provided in a space formed by the substrate, the fulcrum member, and the stoppers, the plate-shaped member having a light reflection area and no fixed end; and
   a plurality of electrodes provided on the substrate, the electrodes facing the plate shaped member;
   wherein the plate-shaped member is tilted and displaced by an electrostatic attraction force in a state where the fulcrum member is a center, so that a reflection direction of a light flux incident on the light reflection area is changed and thereby light deflection is performed; and
   wherein the substrate includes a contact part formed thereon which contacts the plate-shaped member, the contact part including an upper layer and a lower layer, and the upper layer and not the lower layer is made of a main ingredient which is a high melting point metal element.

7. A projection type image display apparatus using an optical system as a projection optical system,
   the optical system comprising:
   a light deflection array;
   a light source configured to light the light deflection array; and
   a projection lens configured to project a reflection light from the light deflection array as corresponding to color information;
   wherein the light deflection array has a plurality of light deflectors which light deflectors are arranged in one dimension or two dimensions,
   the light deflector including:
   a substrate;
   a plurality of control members provided at edge parts of the substrate, the control members having upper parts where stoppers are situated;
   a fulcrum member provided on an upper surface of the substrate, the fulcrum member having a top part;
   a plate-shaped member movably provided in a space formed by the substrate, the fulcrum member, and the stoppers, the plate-shaped member having a light reflection area and no fixed end; and
   a plurality of electrodes provided on the substrate, the electrodes facing the plate shaped member;
   wherein the plate-shaped member is tilted and displaced by an electrostatic attraction force in a state where the fulcrum member is a center, so that a reflection direction of a light flux incident on the light reflection area is changed and thereby light deflection is performed; and wherein the substrate includes a contact part formed thereon which contacts the plate-shaped member, the contact part including an upper layer and a lower layer, and the upper layer and not the lower layer is made of a main ingredient which is a high melting point metal element.

8. A projection type image display apparatus using an optical system as a optical writing unit, the optical system comprising:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stoppers, the plate-shaped member having a light reflection area and no fixed end; and a plurality of electrodes provided on the substrate, the electrodes facing the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and wherein the substrate includes a contact part formed thereon which contacts the plate-shaped member, the contact part including an upper layer and a lower layer, and the upper layer and not the lower layer is made of a main ingredient which is a high melting point metal element.

9. A light deflector, comprising:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stoppers, the plate-shaped member having a light reflection area and no fixed end; and a plurality of electrodes provided on the substrate, the electrodes facing the plate shaped member;

wherein the plate-shaped member is tilted and displaced by an electrostatic attraction force where the fulcrum member is a center, so that a reflection direction of a light flux incident on the light reflection area is changed and thereby light deflection is performed; and wherein the plate-shaped member includes an upper layer and a lower layer, the lower layer contacting a contact part of the substrate, and the lower layer and not the upper layer is made of a main ingredient which is a high melting point metal element.

10. The light deflector as claimed in claim 9, wherein the layer whose main ingredient is the high melting point metal element is made of tungsten.

11. The light deflector as claimed in claim 9, wherein the layer whose main ingredient is the high melting point metal element is made of a titanium nitride film.

12. A light deflection array wherein a plurality of light deflectors is arranged in one dimension or two dimensions, the light deflector comprising:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stoppers, the plate-shaped member having a light reflection area and no fixed end; and a plurality of electrodes provided on the substrate, the electrodes facing the plate-shaped member;

wherein the plate-shaped member is tilted and displaced by an electrostatic attraction force in a state where the fulcrum member is a center, so that a reflection direction of a light flux incident on the light reflection area is changed and thereby light deflection is performed; and wherein the plate-shaped member includes an upper layer and a lower layer, the lower layer contacting a contact part of the substrate, and the lower layer and not the upper layer is made of a main ingredient which is a high melting point metal element.

13. An optical system, comprising:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stoppers, the plate-shaped member having a light reflection area and no fixed end; and a plurality of electrodes provided on the substrate, the electrodes facing the plate-shaped member;

wherein the plate-shaped member is tilted and displaced by an electrostatic attraction force where the fulcrum member is a center, so that a reflection direction of a light flux incident on the light reflection area is changed and thereby light deflection is performed; and wherein the plate-shaped member includes an upper layer and a lower layer, the lower layer contacting a contact part of the substrate, and the lower layer and not the upper layer is made of a main ingredient which is a high melting point metal element.

14. A projection type image display apparatus using an optical system as a projection optical system, the optical system comprising:

a light deflection array;

a light source configured to light the light deflection array; and a projection lens configured to project a reflection light from the light deflection array as corresponding to color information;

wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stoppers, the plate-shaped member having a light reflection area and no fixed end; and a plurality of electrodes provided on the substrate, the electrodes facing the plate shaped member;

wherein the plate-shaped member is tilted and displaced by an electrostatic attraction force in a state where the fulcrum member is a center, so that a reflection direction of a light flux incident on the light reflection area is changed and thereby light deflection is performed; and wherein the plate-shaped member includes an upper layer and a lower layer, the lower layer contacting a contact part of the substrate, and the lower layer and not the upper layer is made of a main ingredient which is a high melting point metal element.

15. A projection type image display apparatus using an optical system as a optical writing unit, the optical system comprising:

a light deflection array;

a light source configured to light the light deflection array; and a projection lens configured to project a reflection light from the light deflection array as corresponding to color information, wherein the light deflection array has a plurality of light deflectors which light deflectors are arranged in one dimension or two dimensions, the light deflector including:

a substrate;

a plurality of control members provided at edge parts of the substrate, the control members having upper parts where stoppers are situated;

a fulcrum member provided on an upper surface of the substrate, the fulcrum member having a top part;

a plate-shaped member movably provided in a space formed by the substrate, the fulcrum member, and the stoppers, the plate-shaped member having a light reflection area and no fixed end; and a plurality of electrodes provided on the substrate, the electrodes facing the plate shaped member;

wherein the plate-shaped member is tilted and displaced by an electrostatic attraction force in a state where the fulcrum member is a center, so that a reflection direction of a light flux incident on the light reflection area is changed and thereby light deflection is performed; and wherein the plate-shaped member includes an upper layer and a lower layer, the lower layer contacting a contact part of the substrate, and the lower layer and not the upper layer is made of a main ingredient which is a high melting point metal element.

* * * * *